(12) United States Patent
Bowles et al.

(10) Patent No.: US 12,086,195 B1
(45) Date of Patent: *Sep. 10, 2024

(54) METHODS AND APPARATUS FOR AUTHOR IDENTIFICATION OF SEARCH RESULTS

(71) Applicant: NetBase Solutions, Inc., Santa Clara, CA (US)

(72) Inventors: Mark Edward Bowles, Redwood City, CA (US); Jens Erik Tellefsen, Los Altos, CA (US); Ranjeet Singh Bhatia, Sunnyvale, CA (US)

(73) Assignee: NetBase Solutions, Inc., Santa Clara, CA (US)

( * ) Notice: Subject to any disclaimer, the term of this patent is extended or adjusted under 35 U.S.C. 154(b) by 223 days.

This patent is subject to a terminal disclaimer.

(21) Appl. No.: 16/538,736

(22) Filed: Aug. 12, 2019

Related U.S. Application Data

(63) Continuation of application No. 14/274,721, filed on May 10, 2014, now Pat. No. 10,380,203.

(51) Int. Cl.
*G06F 7/00* (2006.01)
*G06F 16/9535* (2019.01)

(52) U.S. Cl.
CPC ............... *G06F 16/9535* (2019.01)

(58) Field of Classification Search
CPC . G06F 16/9014; G06F 16/9535; G06F 16/278
USPC .......... 707/722, 736, 737, 748, 749
See application file for complete search history.

(56) References Cited

U.S. PATENT DOCUMENTS

| | | | |
|---|---|---|---|
| 5,694,523 A | 12/1997 | Wical | |
| 5,940,821 A | 8/1999 | Wical | |
| 5,963,940 A | 10/1999 | Liddy et al. | |
| 5,995,922 A | 11/1999 | Penteroudakis et al. | |
| 6,202,064 B1 | 3/2001 | Julliard | |
| 6,675,159 B1 | 1/2004 | Lin et al. | |
| 6,774,899 B1 | 8/2004 | Ryall et al. | |

(Continued)

OTHER PUBLICATIONS

Cardie et al., published Mar. 24, 2003, 8 pages. "Combining Low-Level and Summary Representations of Opinions for Multi-Perspective Question Answering," AAAI Technical Report (Spring Symposium) SS-03-07.

(Continued)

*Primary Examiner* — Md I Uddin
(74) *Attorney, Agent, or Firm* — Kaplan IP Law, PLLC; Jonathan T. Kaplan

(57) ABSTRACT

Given a search result, the set of authors-identifiers appearing in it can be determined by use of a hash function, and an array-type data structure called an audience fingerprint (AF). The AF has as many storage locations as the hash function has possible output values. The number of possible output values is chosen to be large enough, with respect to the maximum number of unique authors expected in any one search result, to create a very high probability of a unique output value for each unique author-identifier that is hashed. At the AF location, addressed with a hash value, is stored an indicator that the author-identifier is present. The indicator can be a single bit, simplifying set operations on AFs. When not in working memory, an AF can be stored as a compacted sparse array. The actual author-identifiers present can be determined, from an AF, with an inverse hash function.

16 Claims, 29 Drawing Sheets

(56) References Cited

U.S. PATENT DOCUMENTS

| | | |
|---|---|---|
| 7,302,383 B2 | 11/2007 | Valles |
| 7,305,336 B2 | 12/2007 | Polanyi et al. |
| 7,356,540 B2 | 4/2008 | Smith et al. |
| 7,496,593 B2 | 2/2009 | Gardner et al. |
| 7,779,007 B2 | 8/2010 | West et al. |
| 7,805,302 B2 | 9/2010 | Chelba et al. |
| 8,046,348 B1 | 10/2011 | Rehling et al. |
| 8,055,608 B1 | 11/2011 | Rehling et al. |
| 2002/0091671 A1 | 7/2002 | Prokoph |
| 2004/0044952 A1 | 3/2004 | Jiang et al. |
| 2004/0078190 A1 | 4/2004 | Fass et al. |
| 2005/0149494 A1 | 7/2005 | Lindh et al. |
| 2005/0165600 A1 | 7/2005 | Kasravi et al. |
| 2007/0156677 A1 | 7/2007 | Szabo |
| 2009/0327259 A1 | 12/2009 | Smith |
| 2011/0087669 A1* | 4/2011 | Ancin .................. G06F 16/325 707/740 |
| 2011/0196855 A1* | 8/2011 | Wable ............... G06F 16/24554 707/711 |
| 2013/0219504 A1* | 8/2013 | Mosier .................. G06F 21/10 726/26 |
| 2015/0254325 A1* | 9/2015 | Stringham ............ G06F 16/278 707/737 |
| 2015/0293997 A1* | 10/2015 | Smith .................... G06Q 50/01 707/749 |

OTHER PUBLICATIONS

Gautam et al., published Feb. 17, 2008 (y/m/d), pp. 2040-2042. "Document Retrieval Based on Key Information of Sentence," IEEE ICACT.

Ruppenhofer et al., published Aug. 25, 2006 (y/m/d), 166 pages. "FrameNet II: Extended Theory and Practice," International Computer Science Institute, University of California at Berkeley, USA.

Wu, Tianhaow et al., published May 3, 2003 (y/m/d), 12 pgs. "A Supervised Learning Algorithm for Information Extraction From Textual Data," Proceedings of the Workshop on Text Mining, Third SIAM International Conference on Data Mining.

Zadrozny, Slawomir et al., published 2003, 5 pgs. "Linguistically quantified thresholding strategies for text categorization," Systems Research Institute, Polish Academy of Sciences, Warszawa, Poland.

Zhang et al., published Jun. 22, 2010 (y/m/d), 10 pgs. "Voice of the Customers: Mining Online Customer Reviews for Product Feature-based Ranking," Proceedings of the 3rd Wonference on Online social networks (WOSN '10). USENIX Association, Berkeley, CA, USA.

\* cited by examiner

|  | Doe | Smith |
|---|---|---|
| John | John Doe | John Smith |
| Robert | Robert Doe | Robert Smith |
| Sally | Sally Doe | Sally Smith |
| Ann | Ann Doe | Ann Smith |
|  |  |  |

| 1 bit data: | 13 bit index: |
|---|---|
| 0 | 0 or 0000000000000 |
| 0 | 1 or 0000000000001 |
| ⋮ | ⋮ |
| 0 | 8190 or 1111111111110 |
| 0 | 8191 or 1111111111111 |

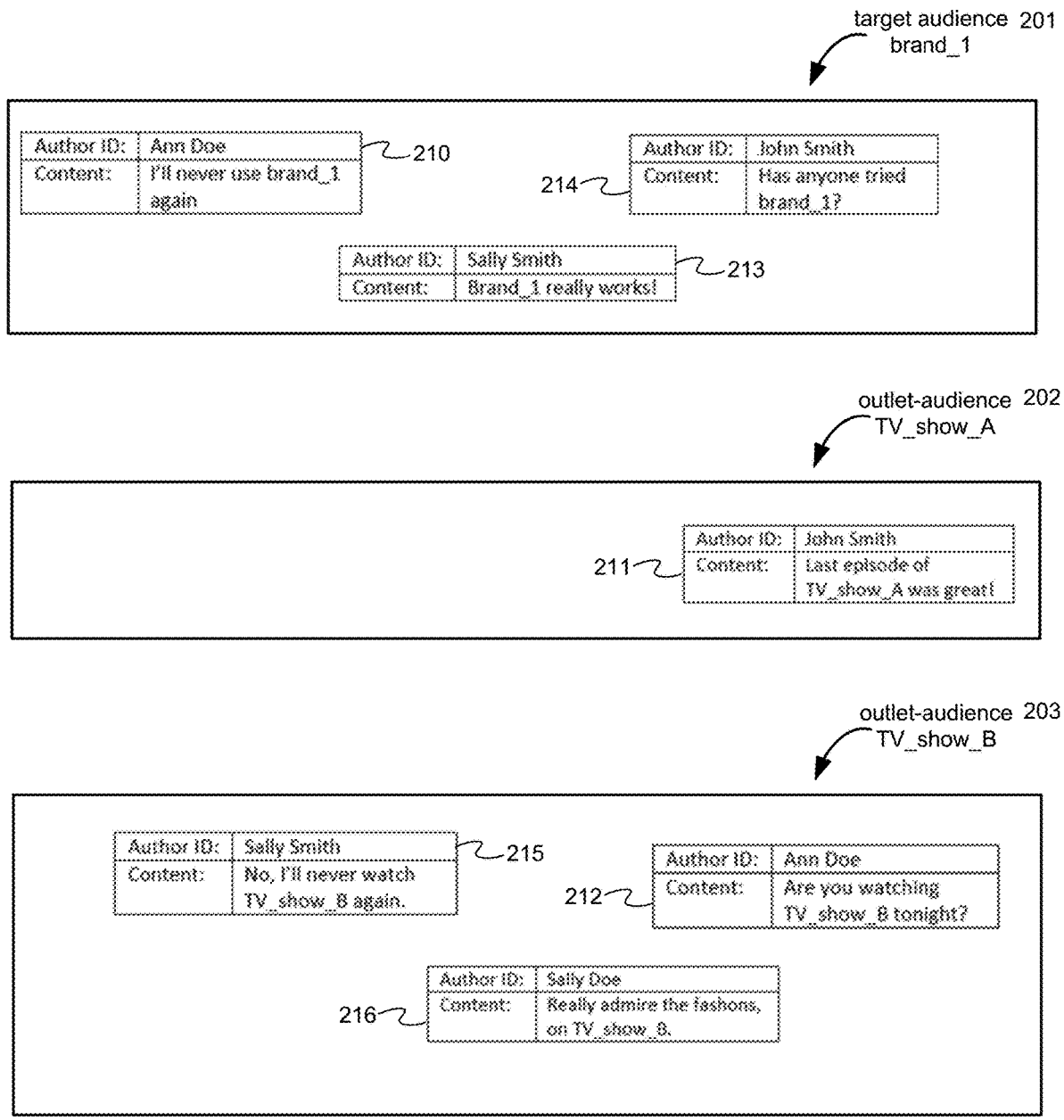

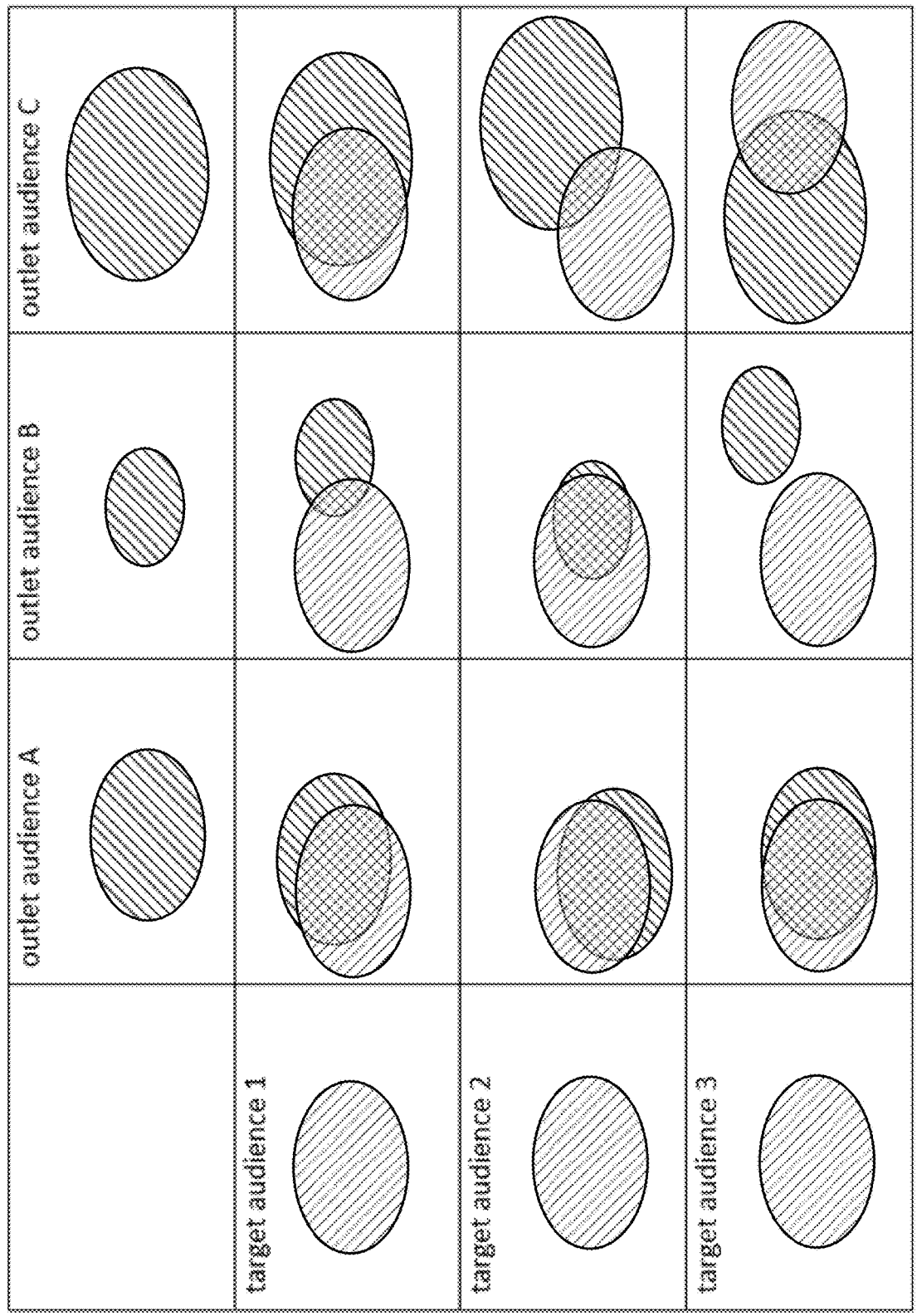

FIGURE 13A
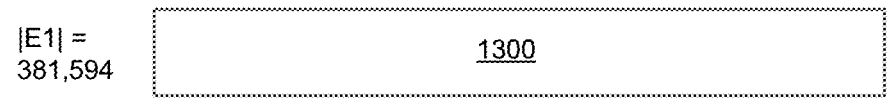
|E1| = 381,594    1300
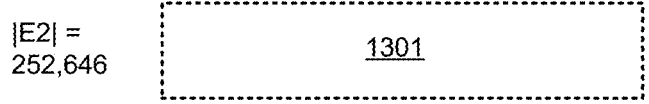
|E2| = 252,646    1301
|E3| = 356,612    1302
FIGURE 13B
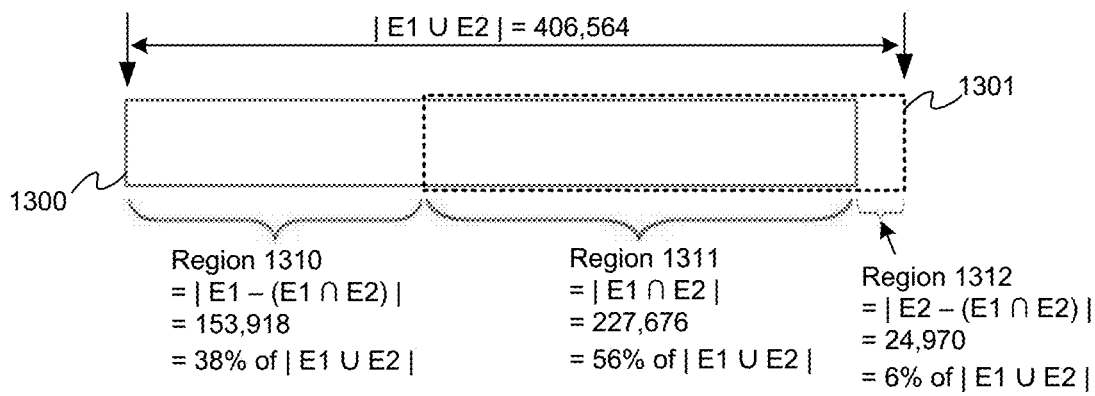
| E1 ∪ E2 | = 406,564
Region 1310
= | E1 − (E1 ∩ E2) |
= 153,918
= 38% of | E1 ∪ E2 |
Region 1311
= | E1 ∩ E2 |
= 227,676
= 56% of | E1 ∪ E2 |
Region 1312
= | E2 − (E1 ∩ E2) |
= 24,970
= 6% of | E1 ∪ E2 |
FIGURE 13C
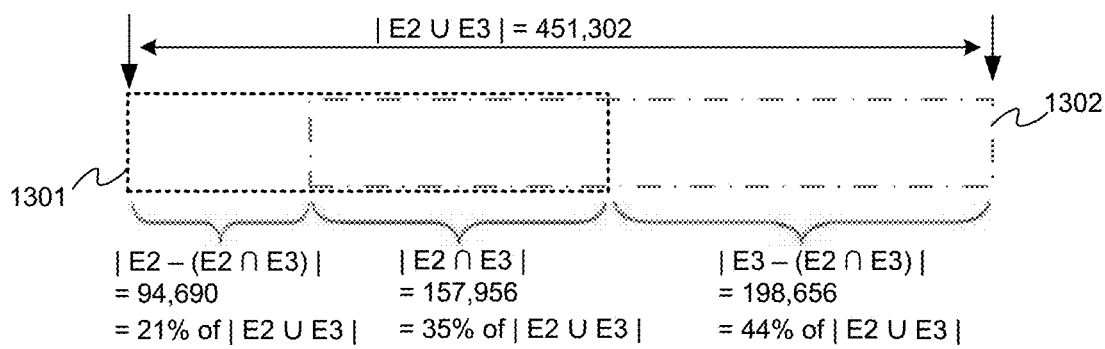
| E2 ∪ E3 | = 451,302
| E2 − (E2 ∩ E3) |
= 94,690
= 21% of | E2 ∪ E3 |
| E2 ∩ E3 |
= 157,956
= 35% of | E2 ∪ E3 |
| E3 − (E2 ∩ E3) |
= 198,656
= 44% of | E2 ∪ E3 |

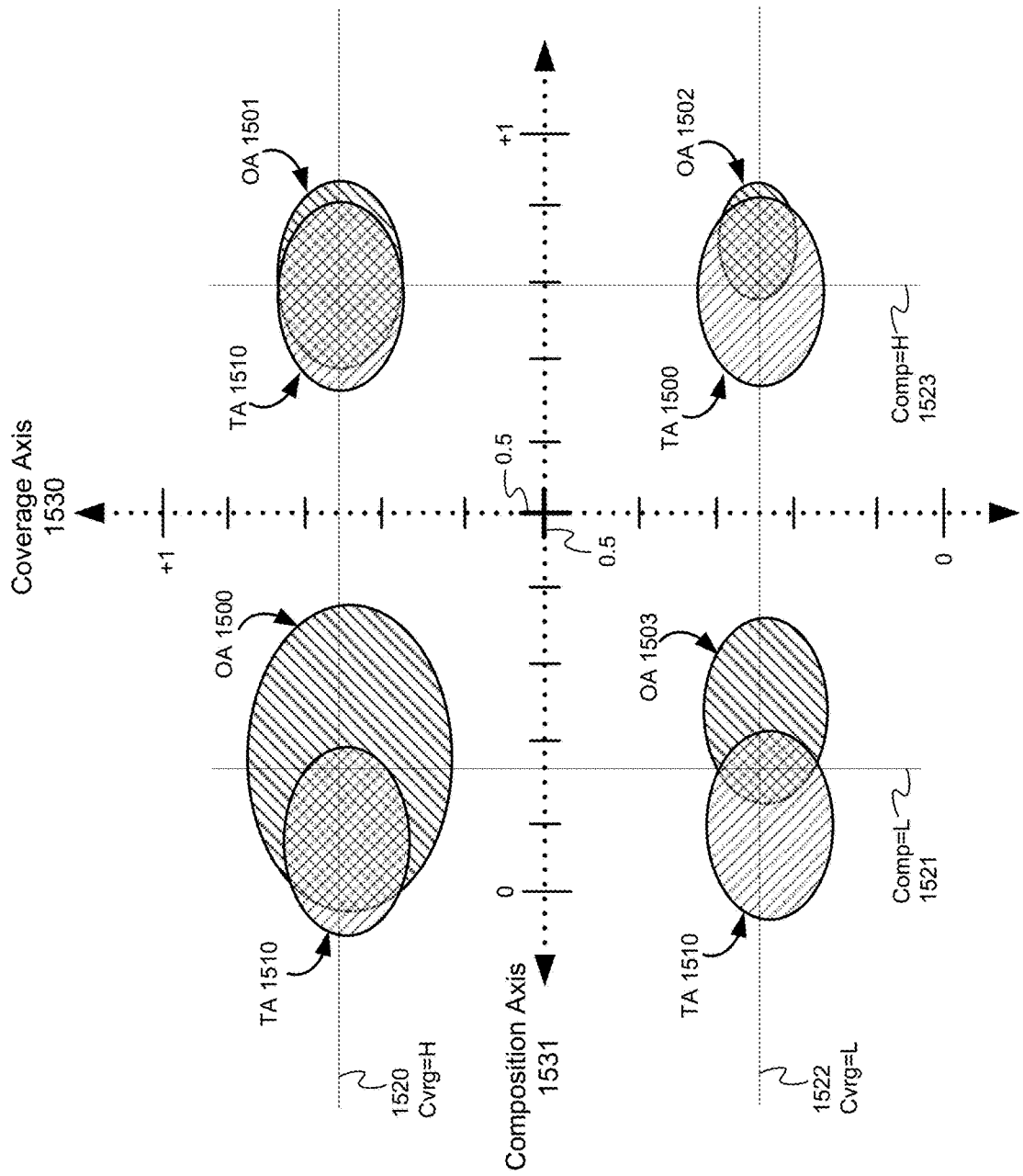

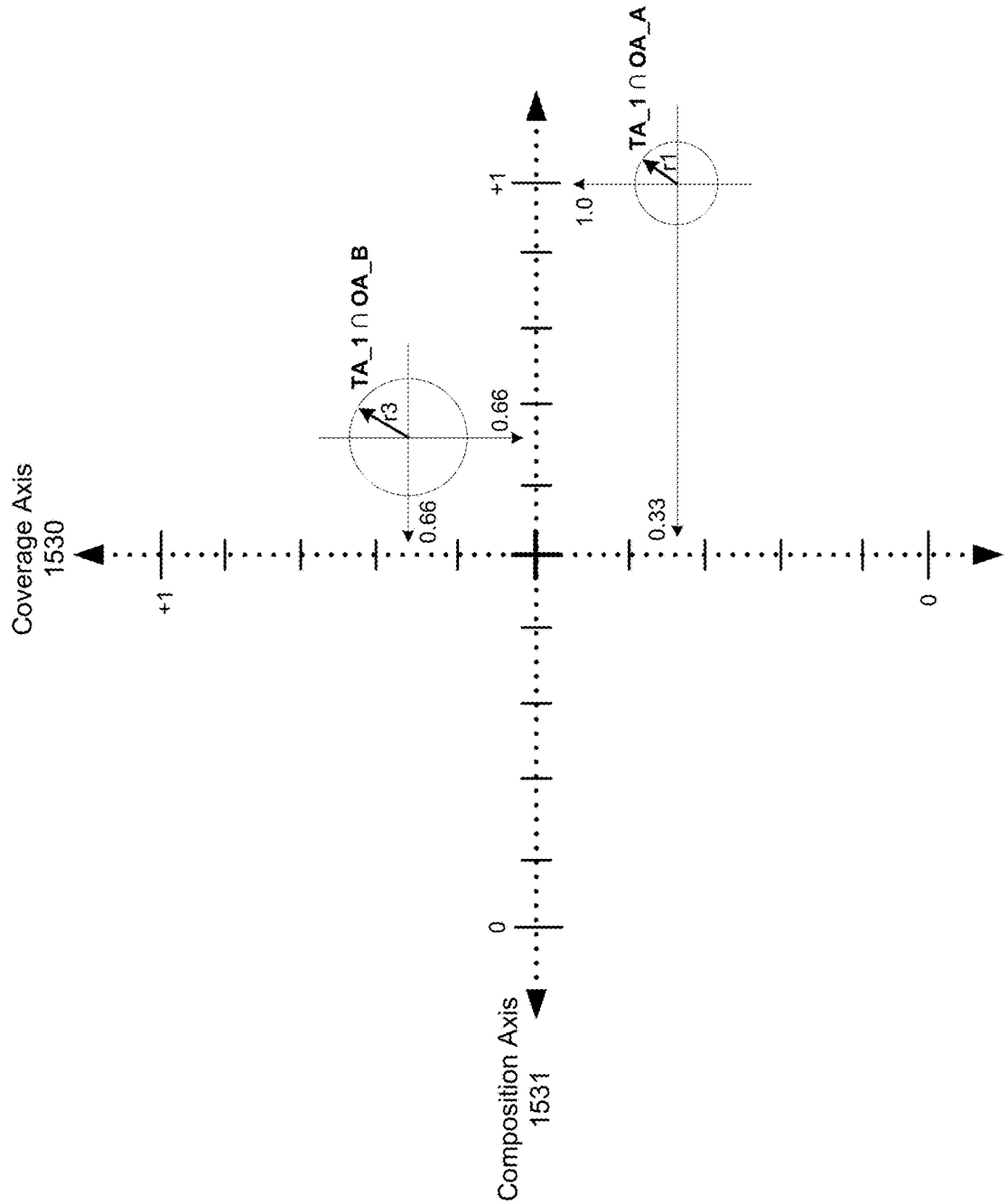

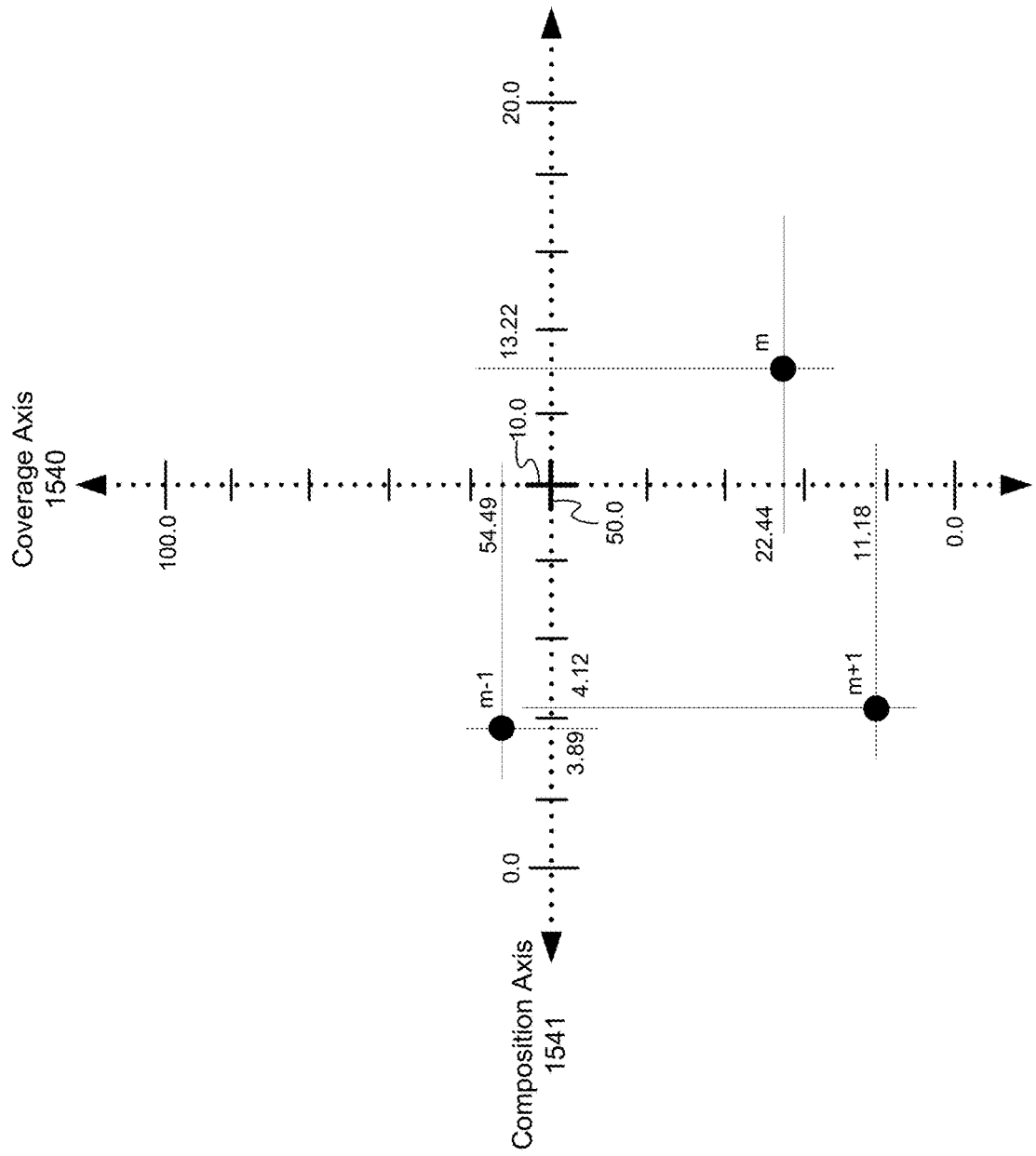

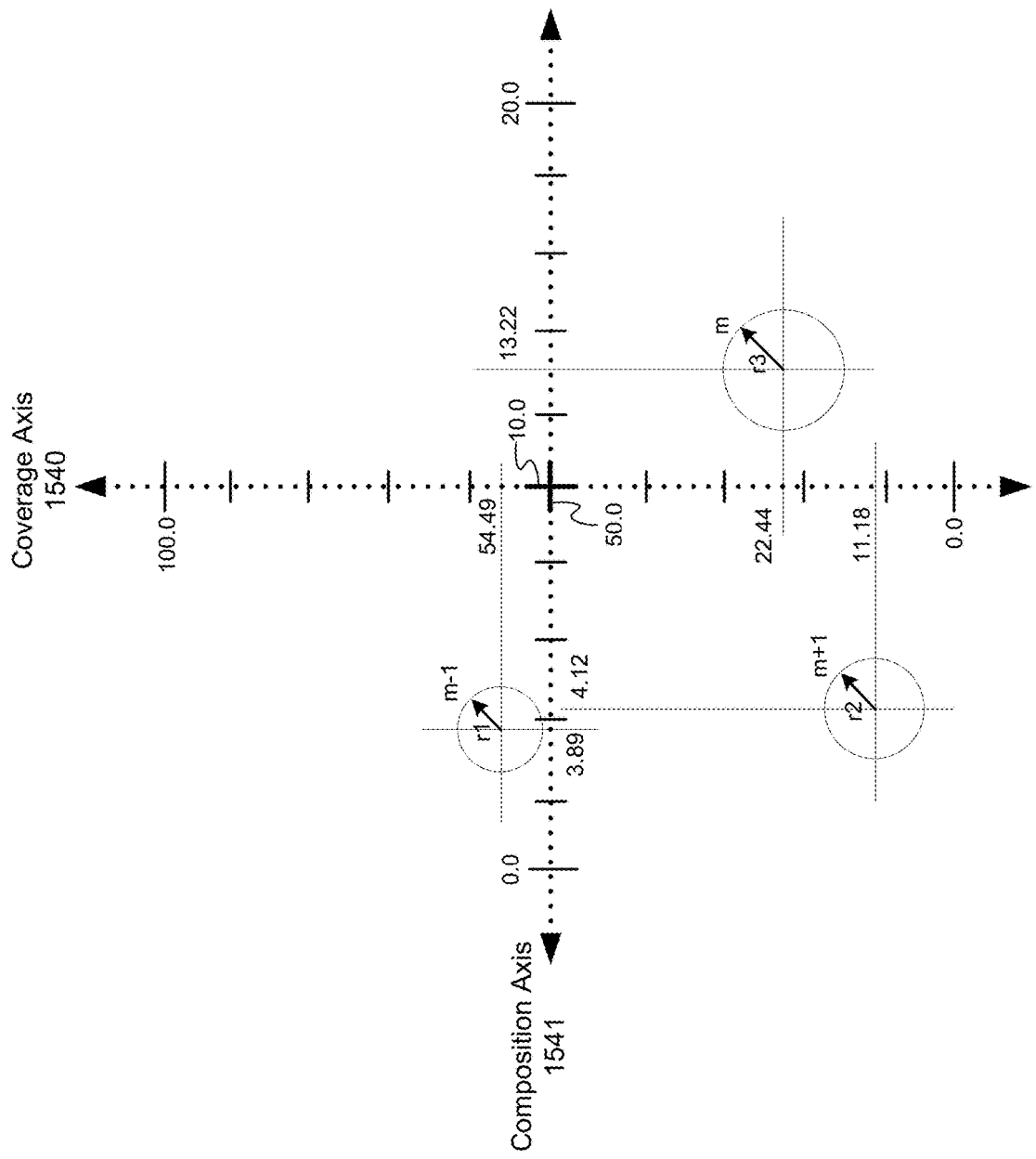

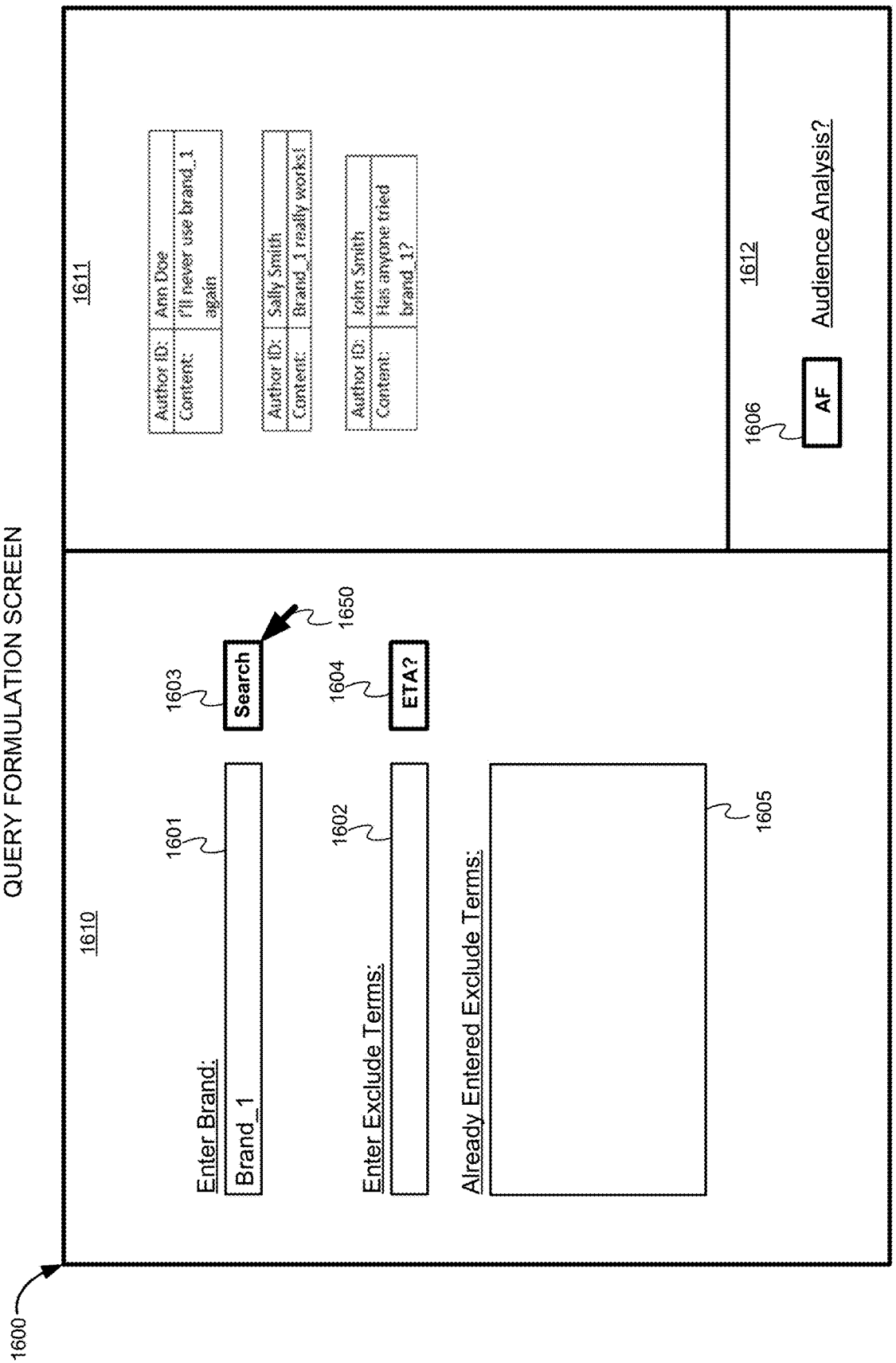

OUTPUT SCREEN

OUTPUT SCREEN

FIGURE 17C
OUTPUT SCREEN

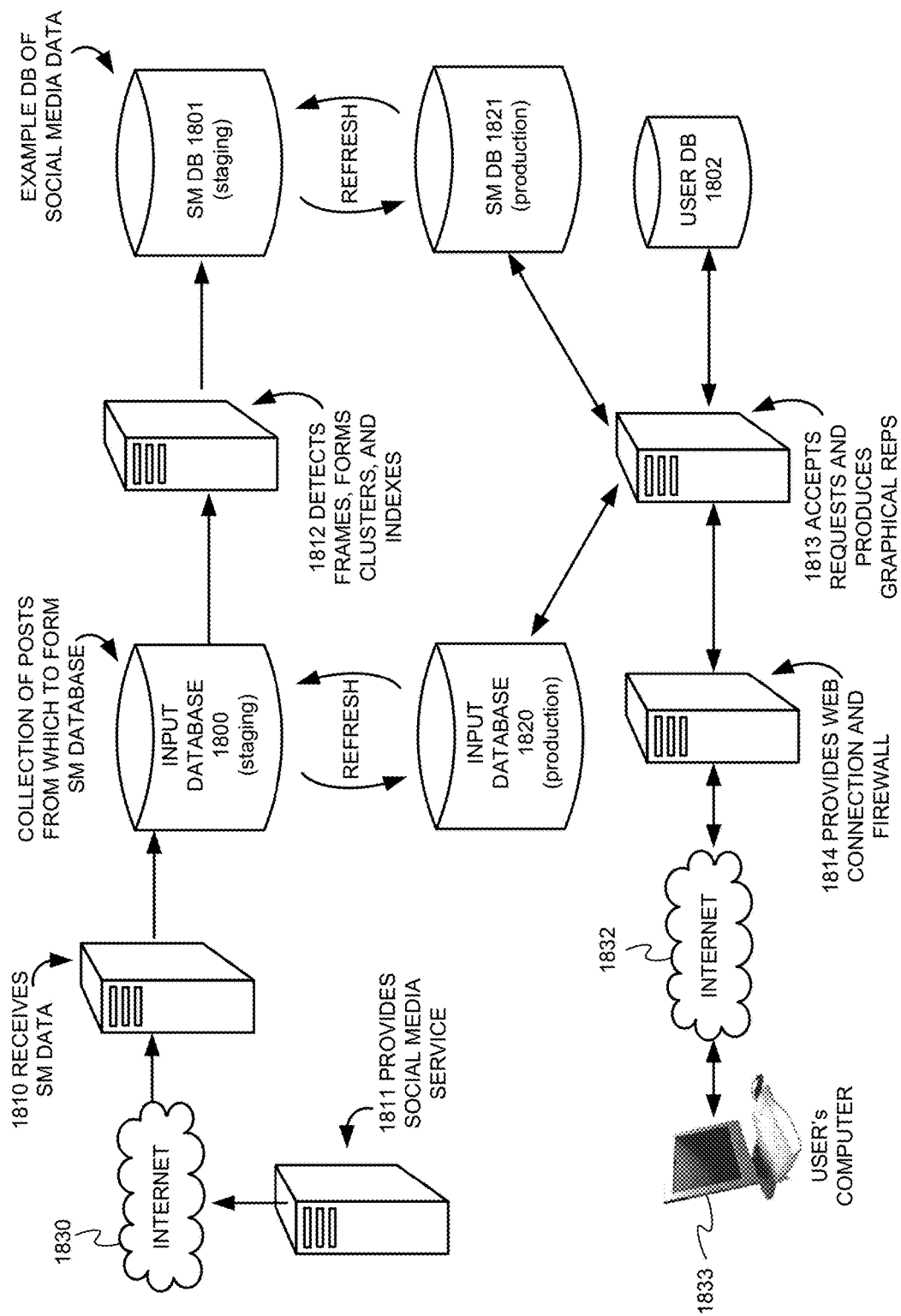

METHODS AND APPARATUS FOR AUTHOR IDENTIFICATION OF SEARCH RESULTS

As provided for under 35 U.S.C. § 120, this patent claims benefit of the filing date of the following U.S. patent application, herein incorporated by reference in its entirety:

"Methods and Apparatus for Author Identification of Search Results," filed 2014 May 10 (y/m/d), having inventors Mark Edward Bowles, Jens Erik Tellefsen, and Ranjeet Singh Bhatia, and application Ser. No. 14/274,721.

CROSS REFERENCE TO RELATED APPLICATIONS

This application is related to the following U.S. patent application(s), which are herein incorporated by reference in their entirety:

"Graphical Representation of Frame Instances and Co-occurrences," filed 2012 Nov. 13 (y/m/d), having inventor(s) Michael Jacob Osofsky application Ser. No. 13/676,073 ("the '073 Application");

"Methods and Apparatuses For Sentiment Analysis," filed 2012 May 14 (y/m/d), having inventors Lisa Joy Rosner, Jens Erik Tellefsen, Michael Jacob Osofsky, Jonathan Spier, Ranjeet Singh Bhatia, Malcolm Arthur De Leo, and Karl Long and application Ser. No. 13/471,417 ("the '417 Application");

"Methods and Apparatuses for Clustered Storage of Information and Query Formulation," filed 2011 Oct. 24 (y/m/d), having inventors Mark Edward Bowles, Jens Erik Tellefsen, and Ranjeet Singh Bhatia and application Ser. No. 13/280,294 ("the '294 Application");

"Methods and Apparatuses for Clustered Storage of Information and Query Formulation," filed 2011 Oct. 25 (y/m/d), having inventors Mark Edward Bowles, and Lei Li and application Ser. No. 13/281,411 ("the '411 Application"); and "Method and Apparatus for HealthCare Search," filed 2010 May 30 (y/m/d), having inventors Jens Erik Tellefsen, Michael Jacob Osofsky, and Wei Li and application Ser. No. 12/790,837 ("the '837 Application").

Collectively, the above-listed related applications can be referred to herein as "the Related Applications."

FIELD OF THE INVENTION

The present invention relates generally to the analysis of search results, and more particularly to identification and analysis on the basis of authorship.

BACKGROUND OF THE INVENTION

Media planning is an important but complex activity for many companies. Media-planning includes such activities as determining, with respect to certain goods or services offered for sale, the media outlets that represent a best match for the target audience.

Traditionally, media planning has been performed with respect to such traditional media outlets as television, radio, magazines, and newspapers. In more recent decades, the task has become even more complex, with the widespread adoption of a plethora of Internet-based media outlets.

With traditional media, a significant limitation, for the media-planning process, has been the set of characteristics by which its audience can be analyzed. Thus, even if a target audience can be precisely defined, a media outlet may simply not have the data, by which its match to the target audience can be evaluated.

This limitation is due mainly to the fact that traditional media operates in only one direction—from the broadcaster (or media producer) to the audience. It is difficult for a traditional media outlet to create the conditions under which information can flow in the opposite direction—from the audience back to the broadcaster or media producer. The reasons for this difficulty include the following:

audience members are unwilling to expend the effort to provide such information;

the logistics of collecting this type of feedback is time-consuming and/or expensive.

It would therefore be desirable to have media-planning tools that can increase the set of characteristics by which an audience of a media outlet can be analyzed, so that media buyers can better match their business goals against the wide range of media options. It would also be desirable to have media-planning tools that can increase the ability of media planners to define their target audiences.

BRIEF DESCRIPTION OF THE DRAWINGS

The accompanying drawings, that are incorporated in and constitute a part of this specification, illustrate several embodiments of the invention and, together with the description, serve to explain the principles of the invention:

FIG. 1A depicts an example universe of potential authors for a very small SM_db.

FIG. 1B depicts an example initialized audience-fingerprint.

FIG. 2B shows three search results produced from SM_db 200.

FIG. 8 shows an example framework, by which three target audiences can be compared with three outlet audiences.

FIG. 13A shows an advantage of using a rectangular representation of set size, compared with the less unconventional Venn diagrams of FIGS. 12B-12C.

FIG. 13B depicts an example graphical format, for comparing the audience of two different episodes of a same show, using the rectangular set-size representations of FIG. 13A.

FIG. 13C is the same as FIG. 13B, except the show that is later in FIG. 13B (E2), becomes the earlier show in FIG. 13C, compared against E3 (the subsequent show to E2).

FIG. 15A shows a kind of two-dimensional display, called a "composition-coverage map," that presents a quadrant-based way to present the categories of overlap of FIGS. 5A-5D.

FIG. 15C shows an approach where, for each type of affinity plotted, its radius is varied (according to an appropriate function) in accordance with the size of its outlet audience.

FIG. 15D shows an example way to display, on a composition-coverage map, the same time periods addressed by FIG. 11.

FIG. 15E is the same as FIG. 15D, except that the radius of each plotted point is varied (according to an appropriate function) in accordance with the size of the target audience.

FIG. 16 shows an example user interface, from which the searches of FIG. 2B can be initiated.

FIG. 17C is the same as FIG. 17B, except that FIG. 17C shows an example use of an inverse hash function.

FIG. 18 depicts an example production-level computer system design in which the techniques described herein can be applied.

DETAILED DESCRIPTION OF PREFERRED EMBODIMENTS

Figure 1C:
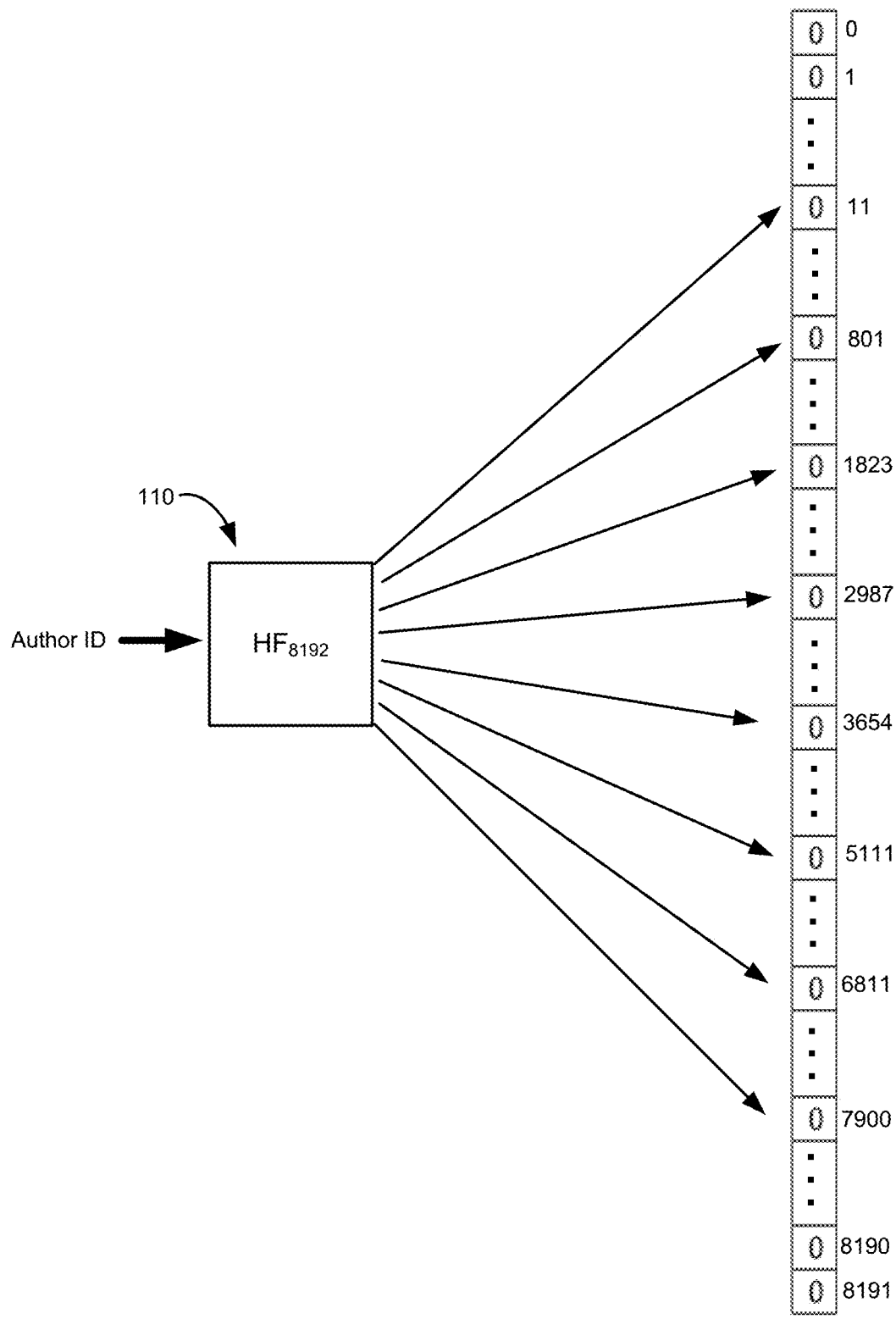
FIG. 1C depicts a hash function $HF_{8192}$, that has been designed to be capable of producing a unique output value, for each of 8 possible author-identifiers.

Reference will now be made in detail to various embodiments of the invention, examples of which are illustrated in the accompanying drawings. Wherever possible, the same reference numbers will be used throughout the drawings to refer to the same or like parts.

In addition to being incorporated by reference in their entirety, the description presented herein specifically relies on many sections of the Related Applications. Please refer to Section 4.1 ("Referring to Related Applications") for an explanation of a systematic notation for reference to them.

Please refer to Section 5 ("Glossary of Selected Terms") for the definition of selected terms used below.

Table of Contents to Detailed Description

Table of Contents to Detailed Description
1 Introduction
2 First embodiment
   2.1 General Structure
   2.2 Examples
   2.3 Overlap Between Like Sets
   2.4 Inverse Hash Function
3 Further Analysis
   3.1 Between Target Audience and Outlet Audience
   3.2 Between Target Audiences
   3.3 Libraries of Pre-Computed Audiences
   3.4 Three or More Target Audiences and/or Outlet Audiences
   3.5 Measuring Affinity over Time
   3.5.1 Between Target Audience and Outlet Audience
   3.5.2 Between Outlet Audiences
4 Additional Information
   4.1 Referring To Related Applications
   4.2 Computing Environment
5 Glossary of Selected Terms

1 Introduction

Considered in a general way, an important part of the media-planning process is the determination of sets of people, and the performing of operations on and between those sets. More specifically, a "media-buyer" (see Glossary) needs to define a "target audience" (see Glossary), and then measure the extent to which the audience, of each potential "media outlet" (see Glossary), matches that target. The audience of a media outlet is also referred to herein as an "outlet-audience" (see Glossary).

Media planning is often performed by a "brand manager" (see Glossary). For each brand that is under his/her control, a brand manager needs to define, understand, and monitor one or more target audiences. The brand manager then needs to determine the best (e.g., most efficient and/or most comprehensive) ways to reach that target audience, typically for purposes of encouraging customer selection of the brands.

The customer (see Glossary) of a brand can be of any type (e.g., person or company), and, in general, the techniques described herein are applicable to any type of customer. Sometimes, for purposes of simplicity of exposition, a customer is referred to as an individual. A customer who is an individual may be referred to as a consumer.

Standard metrics, by which media planning is performed, are "composition" and "coverage." These metrics can be defined as follows (where a numerical subscript identifies a brand and a letter subscript identifies a media outlet):

Let $brand_1$ be a brand for which media planning, by a brand manager $bm_1$, is needed.

Let $mo_A$ and $mo_B$ represent, respectively, media outlets "A" and "B," that are under consideration by $bm_1$ for the marketing of $brand_1$.

Let $ta_1$ be the target audience (i.e., a set of people) for $brand_1$, as defined by $bm_1$.

Let $oa_A$ be the outlet-audience (i.e., a set of people) for $mo_A$; and $oa_B$ be the outlet-audience (i.e., a set of people) for $mo_B$.

If "s" is a set, then |s|=number of elements of s.
From the sets $oa_A$ and $ta_1$, media planning metrics can be determined as follows:
composition: With respect to the $oa_A$, the fraction (or percentage) of $oa_A$ who are also members of the target audience $ta_1$. Symbolically:

$$composition_{A \cap 1, A} = \frac{|oa_A \cap ta_1|}{|oa_A|}$$

Composition is often described as stating, for each potential customer (e.g., a consumer) to view an item of commercial messaging placed on a media outlet, the probability that the customer will be a member of the target audience.

coverage: With respect to $ta_1$, the fraction (or percentage) of $ta_1$ that are also members of the media outlet's audience $oa_A$. Symbolically:

$$coverage_{1 \cap A, 1} = \frac{|ta_1 \cap oa_A|}{|ta_1|}$$

To highlight the difference between composition and coverage, consider the following example: even if the composition of a media outlet's audience is very high, it still may be the case that a media outlet only reaches a small fraction of the total target audience. This kind of distinction is made possible by a determination of coverage, which sets an upper bound, for a media outlet, on the amount of target audience that can be reached.

Composition and coverage for the sets $oa_B$ and $ta_1$, referred to respectively as $composition_{B \cap 1, B}$ and $coverage_{1 \cap B, 1}$, can be determined by corresponding formulas.

In some cases, for the determination of composition and/or coverage, the size of the numerator can be very small with respect to the denominator. For example, to a nearest order of magnitude, a denominator can be 4 orders of magnitude (i.e., $10^4$) larger than the numerator. It can be difficult for a decision maker to obtain an intuitive understanding of such small values, and, further, it can be difficult to compare one such small value to another. In such cases, the composition and/or coverage values under consideration can be processed as follows:
1. They can be expressed in a scientific notation (e.g., $significand \times 10^{exponent}$).
2. The significands and exponents, of the values to be compared, are adjusted such that:
    a. The exponents are all the same.
    b. The variation in size, between the value with the largest significand and the value with the smallest significand, is within a range that permits intuitive comparisons. Typically this means that the largest significand is no more than three orders of magnitude larger than the smallest significand.

In some cases, it can be desirable to eliminate representation of an exponent. In such cases, the values can be discussed just in terms of their significands, with the significands understood to be in units of the following size: a sufficient number of members of the applicable audience (outlet-audience for composition and target audience for coverage) such that the exponent (which is the same for all the significands) is brought to zero. As a very simple example, assume, for an outlet audience "C" of 50,000, only 3 members of that audience are also members of a target audience 1, and only 15 members of the outlet audience are also members of a target audience 2. These amounts of overlap can be expressed as follows:
1. Using scientific notation:
    a.

$$composition_{t \cap 1, c} = \frac{3 \times 10^0}{5 \times 10^4} = 0.6 \times 10^{-4}$$

members of target audience 1, for each single member of the outlet audience
    b.

$$composition_{t \cap 2, c} = \frac{15 \times 10^0}{5 \times 10^4} = 3.0 \times 10^{-4}$$

members of target audience 2, for each single member of the outlet audience
2. Eliminating the exponents (by multiplying by $10^4$) yields:
    a. 0.6 members of target audience 1, for each 10,000 members of the outlet audience, and
    b. 3.0 members of target audience 2, for each 10,000 members of the outlet audience.

In addition to composition and coverage, we define herein the intersection of two sets (such as the intersection of a target audience and an outlet-audience) as a measure of "affinity" between the two sets. As can be seen, composition and coverage are based upon having the size, of a same affinity set, as numerator, the difference being the denominator.

For a traditional media outlet, its audience is typically determined using one or both of the following techniques: subscriber lists and/or statistical sampling of representative populations. For example, if a media outlet is a magazine sold only by subscription, then its audience can be determined from its list of subscribers. For broadcast media, where subscriber lists are not available, viewership can be approximated by statistical sampling of those populations within the broadcast's range.

A brand manager's thinking, about how to define a target audience, is then limited by the characteristics traditionally provided by media outlets.

By using online opinion data, however, many new opportunities arise for defining both the audience of a media outlet and target audiences.

In the past 10 years, with the widespread adoption of interactive online media, customers (and potential customers) are contributing to the store of online content that is available for analysis. In particular, "Social Media" (or SM)) has led to an explosion of readily accessible information written directly by consumers, that can then be analyzed by those who might wish to sell them products or services.

Online tools in this category include, but are not limited to, the following:
FACEBOOK, Inc. (Menlo Park, Calif., U.S.A.)
TWITTER, Inc. (San Francisco, Calif., U.S.A.)
all variety of "web logs" or "blogs"
all variety of "Web 2.0" sites, that facilitate feedback from a site's audience or readers The term "social media database" (or "SM_db"), is used herein to refer to a database that includes, in a large scale and comprehensive way, postings (such as "tweets" on Twitter) to social media (or SM) web sites or services. An SM_db can represent a snapshot of postings to particular social media platforms (e.g., Twitter or Facebook) over a particular time period (e.g., the past year).

While the term SM_db is used consistently herein for purposes of simplicity of exposition, it will be appreciated that, for many of the inventive techniques described herein, an SM_db can be substituted with a database of data obtained from any appropriate source or sources (social media, or otherwise) and that the basic unit of information stored within a substitute database can be of any appropriate type or types (post, or otherwise). Also, where multiple searches are described herein, with respect to a database (such as SM_db), it should be understood that the database described as being searched may actually be representative of multiple databases, with different searches performed upon different databases.

Further, while the present invention is described herein with the example of media planning, it should be understood that the techniques presented herein can be used for any purpose, where it is useful to determine sets of people, and to perform operations on and between such sets.

A particularly useful characteristic of actual SM_db's, as opposed to other types of databases, is that people tend to use them in a very general manner—as a platform by which to discuss almost anything and everything. With respect to the task of media planning, this means that an SM_db has discussions about media outlets, as well as about the goods or services that can be offered on such outlets. With respect to the example sets discussed above, $oa_A$, $oa_B$, and $ta_1$, each can be found by determining, respectively, the following search results (or SR's):

$SR_A$: The result of searching SM_db, via appropriate queries, for any posts that make any kind of reference to $mo_A$.

$SR_B$: The result of searching SM_db, via appropriate queries, for any posts that make any kind of reference to $mo_B$.

$SR_1$: The result of searching SM_db, via appropriate queries, for any posts that make any kind of reference to $brand_1$.

The corresponding audience is found by determining, for each of the above-listed search results, the set of persons who are its authors (also referred to herein as a search result's "audience-fingerprint" or "AF," see Glossary).

The above-defined search results are just for purposes of example. In contrast to traditional media, the present invention offers the opportunity to define an essentially unlimited variety of characteristics, by which a target audience or outlet-audience can be defined and/or analyzed. For example, the '073, '411, and '417 Applications present many different techniques by which queries can be formulated and an SM_db searched. These included keyword searches of text and/or searches based on the identification of frame instances.

Further, once the audience-fingerprints have been determined, the present invention includes a set-representation form, that facilitates operations on and between them.

Rather than just defining a target audience for a $brand_1$ on the basis of whether any kind of reference to $brand_1$ appears, other types of possible searches include the following:

Demographics: This can include any of the typical demographics, such as age range, household income, or gender, that have been available with traditional media. With the present invention, however, such demographic data can be collected much more quickly and with far less expense.

Product Categories: In other words, for an example $brand_1$, the brand manager may be interested in how the general product category, within which $brand_1$ fits, matches with the audiences of the media outlets under consideration. For example, $brand_1$ may be a brand of automobile. The brand manager may be interested in the target audience consisting of all people who are talking about buying a car.

Life Stage: For example, someone who has said "my kids," "my children," "my son," or "my daughter" is, with high probability, in the life stage of being a parent. An example progression of life stages, each of which can be located with an appropriate frame and/or set of search strings, is the following:
K through 12 student
college student
single working adult
married
married with children
empty Nester Any of a wide variety of psychographics. An example psychographic is the following: people interested in healthy breakfasts. More generally, psychographics can be divided into categories, including the following:
activities
interests
opinions
values
attitudes
behavior

2 First Embodiment

2.1 General Structure

Given an arbitrary search result "i" (that we can also symbolically refer to as SR), its audience-fingerprint can be represented by the following data structure:

An array of bits, that can be symbolically referred to as $AF_i$, where each bit can be accessed by a numerical index value. Symbolically, accessing a bit of $AF_i$, at a numerical index "v," can be represented as: $AF_i(v)$.

For each author that could occur in a record of $SR_i$, there is a unique corresponding bit of $AF_i$.

Each bit of $AF_i$ has an initial value, such as "0," indicative that the author it represents is not present (or has not yet been identified) in $SR_i$.

For each author that does occur in at least one record of $SR_i$, the corresponding bit of $AF_i$ is set to a value, such as "1," indicative that the author it represents is present.

An example way to achieve the above-described correspondence, between each potential author of $SR_i$ and a unique bit of $AF_i$, is through a hash function (symbolically, we can also refer to the hash function as "HF"). Using known techniques, for construction of hash functions, a suitable HF can be found as follows:

The maximum number of unique values an HF needs to be capable of producing, symbolically referred to herein as "maxval_HF," is determined. These values can be over a range, for example, of 0 to (maxval_HF−1), where each value can serve as an index to an $AF_i$.

To determine maxval_HF, the SM_db, from which any $SR_i$ of interest is to be found, can be analyzed to determine the maximum number of unique authors, at any one time, its total content can be expected to represent. Symbolically, this maximum can be referred to as "MUA."

Because of inefficiencies of typical hash functions, to ensure a unique output value for each unique input value (or, at least, to create a very high probability of a unique output value for each unique input), maxval_HF typically needs to be much larger than MUA (symbolically, maxval_HF>>MUA). For example, maxval_HF might need to be three orders of magnitude (or more) larger than MUA (e.g., maxval_HF=MUA×$10^3$).

The HF can be applied to each "author-identifier" (see Glossary), of each record of an $SR_i$. For example, if SM_db is composed of Twitter Tweets, HF can be applied to the Twitter-handle of each record of $SR_i$.

Advantages of a hash function (for purposes of assigning a unique number to each unique author), when compared with known approaches for establishing correspondences, include the following:

small time period within which it can be evaluated; and consuming a small amount of memory space.

For example, by way of comparison, a database of records can be established using relatively little memory space (e.g., just one record for each correspondence), but lookup time is relatively slow. On the other hand, an array to which one could directly apply each author-identifier would be fast, except the memory requirements for utilizing this type of array would be prohibitive.

A hash function allows the initially enormous space of potential author-identifiers to be reduced to a size sufficient for the actual needs of the database to be searched, where such need is measured by the maximum number of unique authors that appear. In general, a hash function has the characteristic of reducing inputs of varying length into an output requiring a fixed number of digits (or bits).

For example, an SM_db could have $10^5$ unique authors. If it is determined that maxval_HF needs to be at least $10^3$ larger, then an array capable of accepting $10^8$ unique index values is needed. In binary, representing this number of values requires a hash function that outputs 27 bit values (since $2^{27} \approx 10^8$). In comparison, an author identifier is typically in the range of 8 to 50 characters. Even if only 8 bits are used per character, this means an author identifier ranges in length from 64 to 400 bits. Thus, a 27 bit hash value is always significantly smaller than the original author identifier, and is often an order of magnitude smaller. Further, the number of storage locations for an $AF_i$ increases exponentially, for each additional bit added to the index value it can accept. Thus, the reduction in index-value bits, made possible with a hash function, makes it possible to design a system with a known, and manageable, storage requirement.

A further technique for reducing the amount of storage required for each audience-fingerprint, to an amount that is within the capabilities of ordinary current computing technology, is to store only one bit per index value. For the example discussed above, of $10^8$ input values to an $AF_i$, this means that only $10^8$ bits, or 12.5 MB, of storage are needed. Further, when an audience-fingerprint is not actually being used (e.g., it is not in a computer's working memory), it is a sparse array that can be stored in a compact form, using any of the known techniques for sparse-array compaction.

When it is being operated upon (e.g., resident in working-memory), a single-bit-per-input-value (or similar bit-level) representation of audience-fingerprints means that current computer architectures (such as those by INTEL Corporation, Santa Clara, Calif.; ARM Holdings PLC, Cambridge, England; or MIPS Technologies, Inc., Sunnyvale, Calif.) can perform fast operations on and between them. Relating audience-fingerprints to the media planning operations described above, lead to the following implementation strategies:

First, a determination can be made, regarding an SM_db, as to whether the total universe of unique authors it contains (or is likely to contain) can be represented by a particular maxval_HF. We shall refer to this representative maxval_HF as being of value "m."

If value "m" is determined, then a deterministic hash function, $HF_m$, can be determined. $HF_m$ can be designed to be accommodative of "m," by being designed to produce (with at least a very high level of probability), for each of the "m" possible unique author identifiers, a unique hash value output.

$HF_m$ can then be used for purposes of determining all audience-fingerprints. An advantage of using the same $HF_m$, for all audience-fingerprints, is that the audience-fingerprints so-derived are compatible, for purposes of performing set operations. This is true because, even if there is no simple correlation between an author-identifier and its corresponding bit in an audience-fingerprint, it can be assumed that, if a same bit is set in two different audience-fingerprints, they have both been set as a result of an identical author-identifier.

Using a same $HF_m$, the following, compatible, audience-fingerprints can be produced:

For $SR_1$, it can be translated into an audience-fingerprint $AF_1$, representative of $ta_1$.

For $SR_A$, it can be translated into an audience-fingerprint $AF_A$, representative of $oa_A$.

For $SR_B$, it can be translated into an audience-fingerprint $AF_B$, representative of $oa_B$.

In terms of the determination-of-size set operation, represented symbolically above as |s| for a set "s," it can be determined, with respect to an audience-fingerprint, by simply counting the number of 1's present.

In terms of the set-intersection operation, also needed for determination of composition and coverage, it can be determined by a bit-wise AND operation, between the relevant audience-fingerprints. For example, $ta_1 \cap oa_A$ can be determined by a bit-wise AND between $AF_1$ and $AF_A$.

While an example requiring its use was not specifically presented above, the set-union operation can be performed by a bit-wise OR operation, between the relevant audience-fingerprints. The set-union operation can be useful, for example, when it is more convenient to build a set through multiple searches, with each search known to (or believed to) contribute set members not present in any of the other searches.

Also, the operation of subtracting a second set from the first set can be accomplished by the following bitwise operation: for each bit of the second set, set to a value indicative of an element being part of the second set, the corresponding bit of the first set is set to a value indicative of the element not being part of the first set. Equivalently, subtraction can be accomplished by first determining the bitwise NOT of the second set. The bitwise AND, of the first set with the NOT of the second set, completes the subtraction operation.

2.2 Examples

FIG. 1A depicts an example universe of potential authors for a very small SM_db. In particular, it has been determined, through any suitable method, that a maximum of 8 unique authors can be expected (i.e., MUA=8). To make the situation particularly simple, each author can have 1 of 4 possible first-names and 1 of 2 possible last names. While conventional person names are shown in FIG. 1A, it should be understood that each of these names can correspond to any suitable author-identifier, such as an email address, or Twitter handle (or any other type of handle).

It is then assumed that a maxval_HF needs to be about three orders of magnitude larger than MUA (i.e., maxval_HF=8000). In binary, this means a hash function capable of producing 13 bit values (since $2^{13}$=8192). Relating this to our general discussion above, this means creating a deterministic hash function where m=8192 (symbolically, $HF_{8192}$).

FIG. 1B depicts an example initialized audience-fingerprint, that accepts an index ranging from values 0 (or 0000000000000 in binary) to 8191 (or 1111111111111 in binary). At each index location, the one bit of data that can be stored is initialized, for example, to zero.

In FIG. 1C, the box labeled "HF 110" is intended to represent $HF_{8192}$. As can be seen, $HF_{8192}$ has been designed, using known techniques for the creation of hash functions, to produce a unique output value for each of the 8 possible author-identifiers (of FIG. 1A) that can be applied to its input. For purposes of example, FIG. 1C depicts an $HF_{8192}$ that produces the following 8 output values (the correspondence of each of which, to an author-identifier, is not shown): 11, 801, 1823, 2987, 3654, 5111, 6811, and 7900.

Figure 2A:
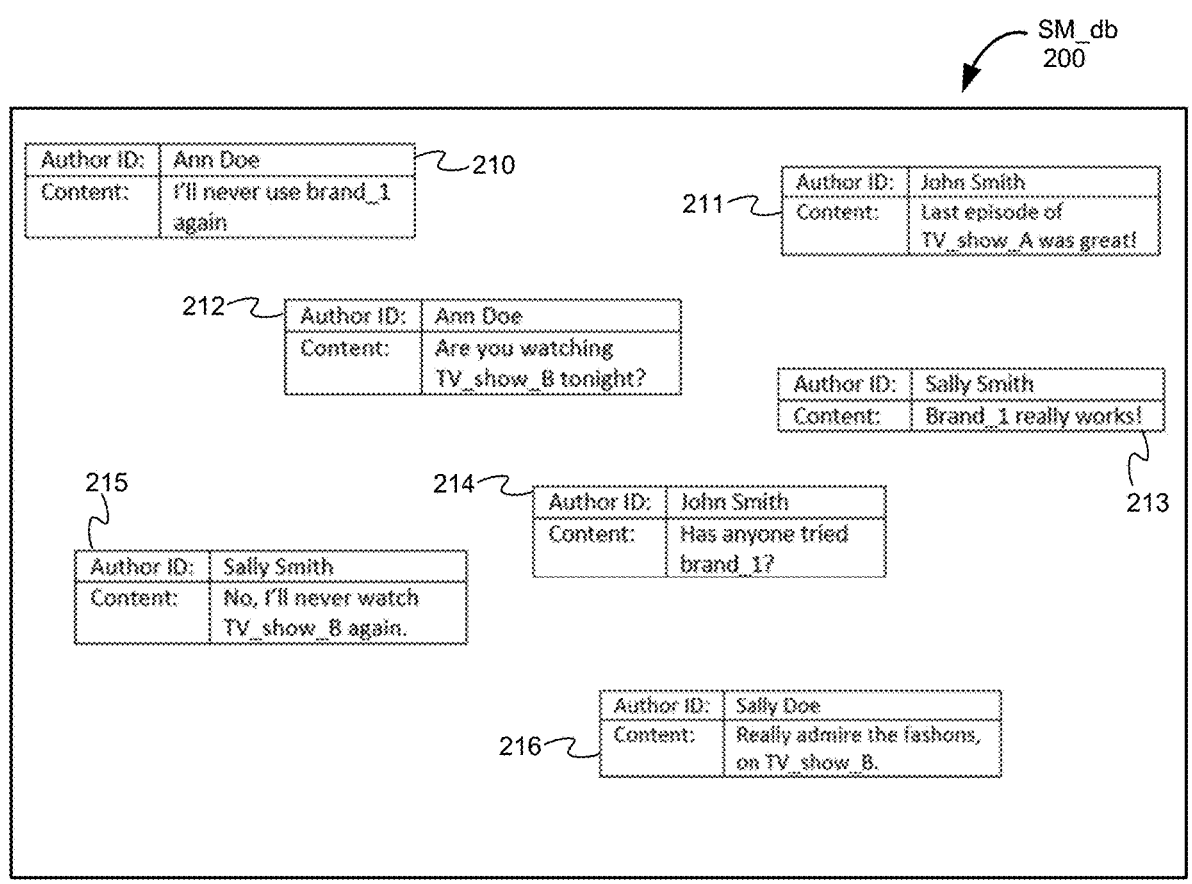
FIG. 2A depicts an example social media database (SM_db) 200, for which seven posts, numbered 210-216, are shown.

FIG. 2A depicts an example SM_db 200, for which seven posts, numbered 210-216, are shown. Each post is shown as having two fields: Author ID, and Content. Since the number of posts in the example database is very small, it can be readily seen that, of the total universe of eight possible authors shown in FIG. 1A, the following four authors are responsible for the posts shown in SM_db 200 (alphabetical by last name, then first name): Ann Doe, Sally Doe, John Smith, and Sally Smith. As can be seen, each post discusses either a brand_1, a TV_show_A, or a TV_show_B.

Figure 3A:
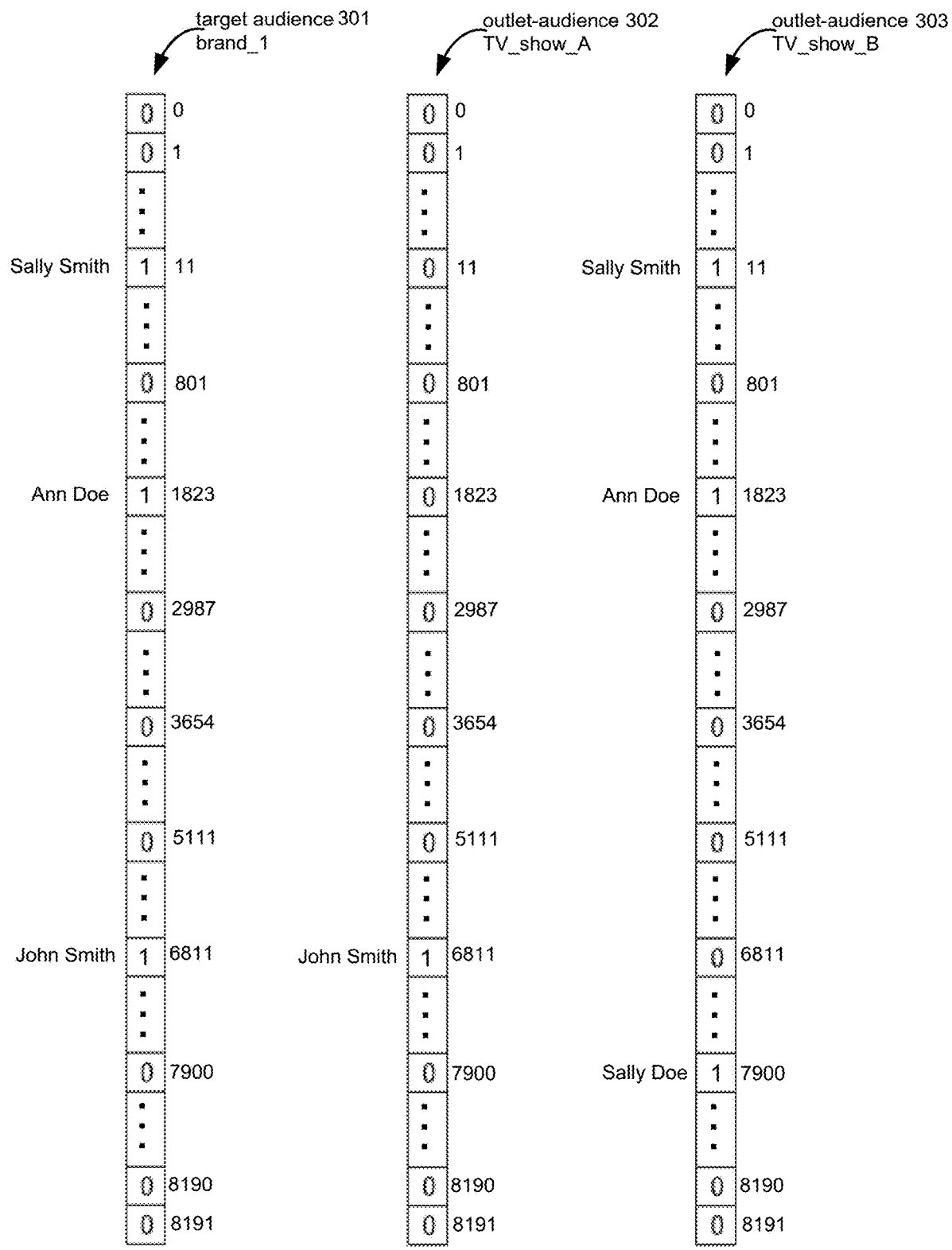
FIG. 3A depicts three audience-fingerprints, that correspond to the three search results of FIG. 2B.

FIG. 2B shows three search results produced from SM_db 200, numbered 201, 202, and 203, intended to provide the basis for determining, respectively, the following:
  target audience for brand_1
  outlet-audience for TV_show_A
  outlet-audience for TV_show_B FIG. 3A depicts three audience-fingerprints, numbered 301, 302, and 303, that correspond to, respectively, search results 201, 202, and 203. Each search-result to audience-fingerprint correspondence is discussed in detail as follows:
  Audience-fingerprint 301 shows that $HF_{8192}$ converted the Author ID's of 201 as follows (in ascending order of output hash value produced):
    "Sally Smith" is converted to 11
    "Ann Doe" is converted to 1823
    "John Smith" is converted to 6811
  Audience-fingerprint 302 shows that $HF_{8192}$ converted the Author ID "John Smith," of search result 202, to 6811.
  Audience-fingerprint 303 shows that $HF_{8192}$ converted the Author ID's of search results 203 as follows (in ascending order of output hash value produced):
    "Sally Smith" is converted to 11
    "Ann Doe" is converted to 1823
    "Sally Doe" is converted to 7900

As can be seen, because $HF_{8192}$ is deterministic, each time a same Author ID is input, a same number is output. For example, for both audience-fingerprints 301 and 302, "John Smith" is converted to 6811. As another example, "Sally Smith" is converted to a value of 11 for both audience-fingerprint 301 and audience-fingerprint 303.

As discussed in general above, the size of the audience represented by an audience-fingerprint can be determined simply by counting the number of bits set to "1." For example, counting the number of 1's in audience-fingerprint 301 shows that the target audience for brand_1 contains three people, two of which are female and one who is male.

Figure 3B:
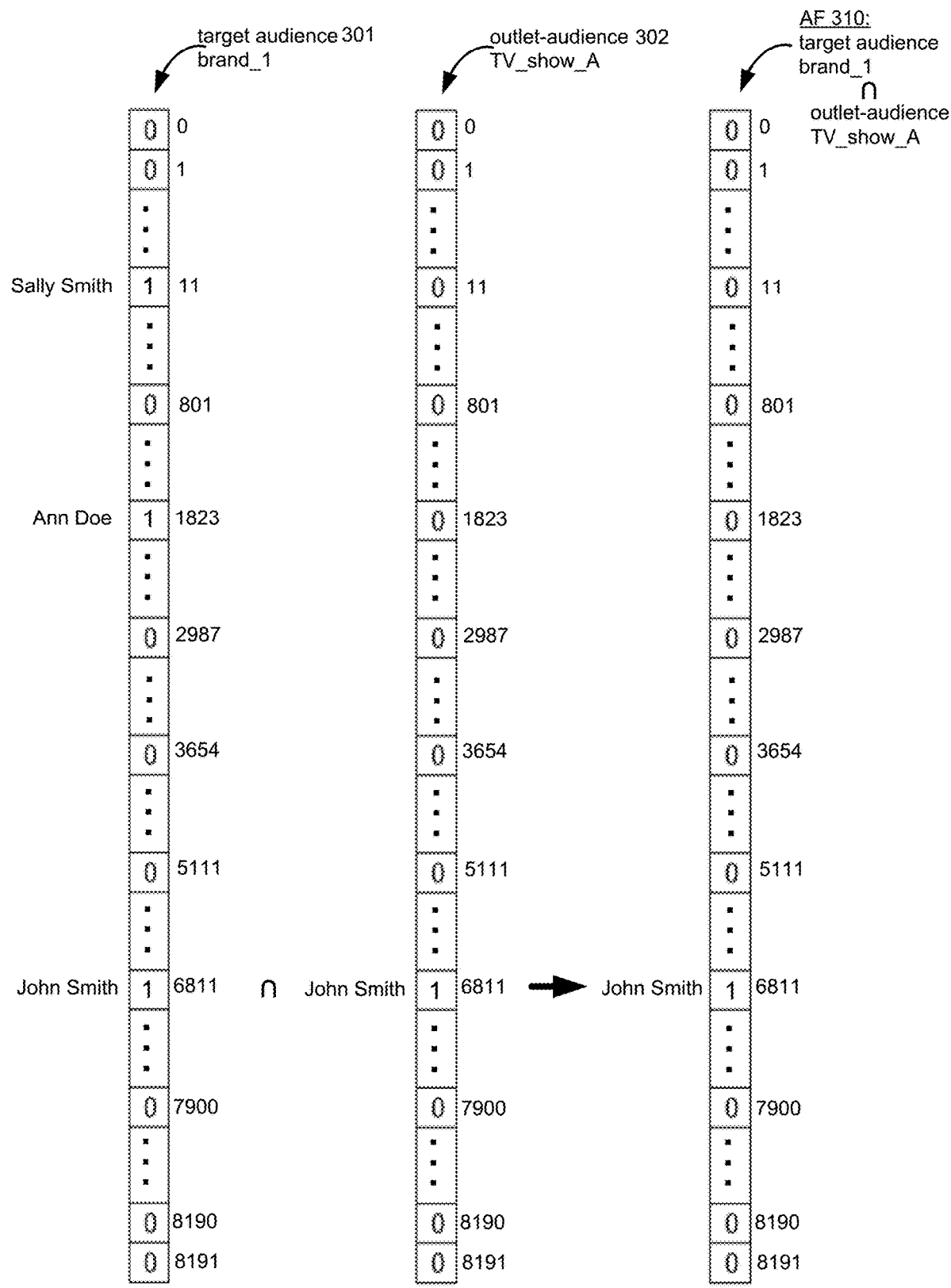
FIGS. 3B-3C each show how an intersection can be determined, from two audience fingerprints.
Figure 3C:
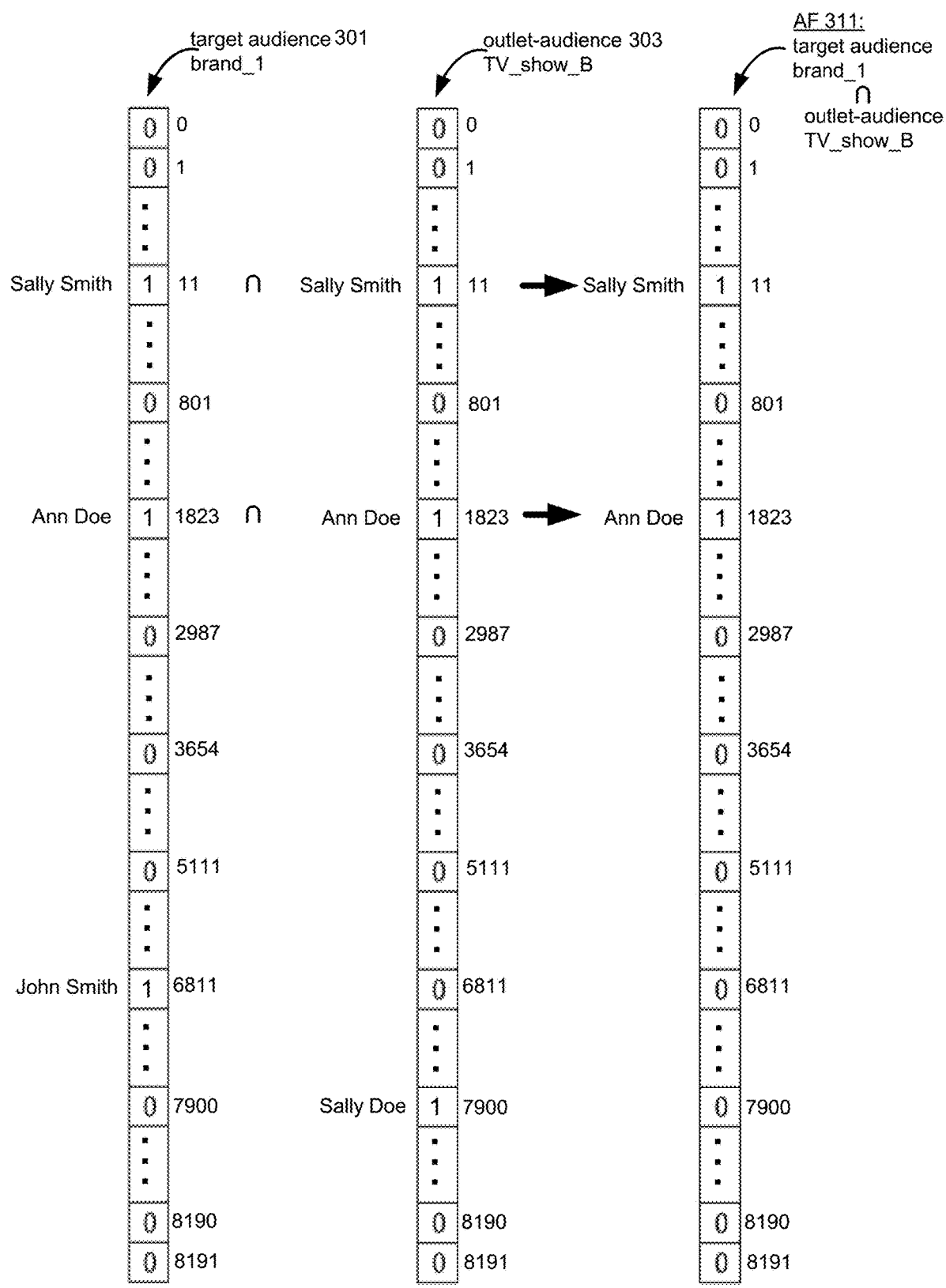

FIG. 3B shows how an "affinity" 310 can be determined from audience-fingerprint 301 (the target audience for brand_1) and audience-fingerprint 302 (the outlet-audience of TV_show_A). As can be seen, the only element in common, between 301 and 302 is "John Smith." Similarly, FIG. 3C shows how an "affinity" 311 can be determined from audience-fingerprint 301 (the target audience for brand_1) and audience-fingerprint 303 (the outlet-audience of TV_show_B). In this case, elements "Sally Smith" and "Ann Doe" are common to the target audience and outlet-audience (element "John Smith" of AF 301, and element "Sally Doe" of AF 303, drop out).

If the brand manager for brand_1 is deciding between advertising on TV_show_A or TV_show_B, he or she can compute the following values:

Between target audience 1 and TV_show_A:

$$\text{composition}_{A \cap 1, A} = \frac{|oa_A \cap ta_1|}{|oa_A|}$$
$$= \frac{|AF_{302} \cap AF_{301}|}{|AF_{302}|}$$
$$= \frac{|AF_{310}|}{|AF_{302}|}$$
$$= \frac{1}{1}$$
$$= 1 \text{ or } 100\%$$

$$\text{coverage}_{1 \cap A, 1} = \frac{|ta_1 \cap oa_A|}{|ta_1|}$$
$$= \frac{|AF_{301} \cap AF_{302}|}{|AF_{301}|}$$
$$= \frac{|AF_{310}|}{|AF_{301}|}$$
$$= \frac{1}{3} \text{ or } 33\%$$

Between target audience 1 and TV_show_B:

$$\text{composition}_{B \cap 1, B} = \frac{|oa_B \cap ta_1|}{|oa_B|}$$
$$= \frac{|AF_{303} \cap AF_{301}|}{|AF_{303}|}$$
$$= \frac{|AF_{311}|}{|AF_{303}|}$$
$$= \frac{2}{3} \text{ or } 66\%$$

$$\text{coverage}_{1 \cap B, 1} = \frac{|ta_1 \cap oa_B|}{|ta_1|}$$
$$= \frac{|AF_{301} \cap AF_{303}|}{|AF_{301}|}$$
$$= \frac{|AF_{311}|}{|AF_{301}|}$$
$$= \frac{2}{3} \text{ or } 66\%$$

A brand manager, seeking to choose between media outlet "A" or "B," is then faced with the following considerations:
  Media outlet "A" has a very high composition (composition$_{A \cap 1,A}$=100%), but the outlet's coverage is rather low (coverage$_{1 \cap A,1}$=33%).
  Conversely, media outlet "B" has a lower composition (composition$_{B \cap 1,B}$=66%), but the outlet's coverage is twice as good (coverage$_{1 \cap B,1}$=66%).

An example user interface, from which the above-described searches can be done, is depicted in FIG. 16. FIG. 16 shows an example user-interface computer screen 1600. Screen 1600 is shown as being divided into three sub-panels:

1. Subpanel 1610: corresponds to FIG. 10A of the '294 Application, described in Section 2.1 ("Consumer Sentiment Search") of the '294 Application. Subpanel 1610 contains a search term entry box 1601 into which terms, to search for a "brand," can be entered. In FIG. 16, the example brand name "brand_1" has already been entered. A mouse pointer 1650 is shown as having already selected search "button" 1603. As discussed at some length in the '294 Application, in order to identify genuine instances in which a friend name is being used, it is often necessary to formulate "exclude terms," that, if found, exclude a record from actually being included in a search result. Exclude terms can be entered into box 1602. If help is needed, with identifying appropriate exclude terms, an Exclude Term Assistant (ETA) can be activated with button 1604 (see the '294 Application, Section 2.2, for discussion of ETA). Box 1605 is used for display of already-entered exclude terms.

2. Subpanel 1611: shows the actual posts found, in SM_db 200 of FIG. 2A, as a result of searching for posts mentioning brand_1. By being able to review the actual posts found, in subpanel 1611, a user is able to determine whether a sufficiently accurate search has been formulated. The posts displayed by subpanel 1611 correspond to the target audience 201 of FIG. 2B.

3. Subpanel 1612: Having decided that an appropriate search query has been formulated, subpanel 1612 permits the initiation of the process by which the audience, represented by a search result, can be determined. In particular, pressing a button 1606 causes the audience fingerprint (or AF) to be determined.

While FIG. 16 depicts a search to determine a target audience, in a similar way, the brands TV_show_A and TV_show_B can each be entered into search box 1601, to produce an outlet audience for each of these media outlets.

Figure 17A:
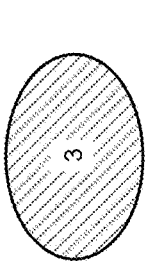
FIG. 17A illustrates an example user interface, by which the audience fingerprints and intersections, of FIGS. 3A-3C, can be viewed.

Having formulated an appropriate query, for each of brand_1, TV_show_A, and TV_show_B, and having requested the determination of an audience fingerprint for each, a user can see a user interface of the kind shown in FIG. 17A. FIG. 17A depicts an example computer screen 1700. Computer screen 1700 is divided into four columns (1701, 1702, 1703, and 1704) and three rows (1711, 1712, and 1713).

The subpanel at the intersection of column 1701 and row 1711 shows a graphical representation of the audience fingerprint for brand_1. In other words, the oval-shaped at this intersection represents audience fingerprint 301 (or AF$_{301}$) of FIG. 3A. Since AF$_{301}$ represents three authors, it's graphical representation in FIG. 17A contains the notation "3."

Similarly, subpanel at the intersection of column 1702 and row 1711 shows a graphical representation of audience fingerprint 302 for TV_show_A (or AF$_{302}$) of FIG. 3A, and the subpanel at the intersection of column 1703 and row 1711 shows a graphical representation of audience fingerprint 303 for TV_show_B (or AF$_{303}$).

In each of rows 1712 and 1713, at columns 1701, 1702, and 1703, are shown check-boxes, by which audience fingerprints can be selected for intersection. For example, the checkbox at the intersection of rows 1712 and column 1702 is shown as being pointed to by mouse pointer 1750.

As can be seen for row 1712, the checkboxes of columns 1701 in 1702 have been checked, therefore resulting, in column 1704, in an intersection of the audience for brand_1 with the audience for TV_show_A. Along with a graphical representation of the intersection, this subpanel (i.e., the subpanel at the intersection of row 1712 and column 1704) also shows the values for coverage (33%) and composition (100%).

Similarly, for row 1713, the checkboxes of columns 1701 in 1703 have been checked, therefore resulting, in column 1704, in an intersection of the audience for brand_1 with the audience for TV_show_B. Along with a graphical representation of the intersection, this subpanel (i.e., the subpanel at the intersection of row 1713 and column 1704) also shows the values for coverage (66%) and composition (66%).

2.3 Overlap Between Like Sets

In addition to the metrics of composition and coverage, it can be useful to measure the amount of overlap between sets of the same type (e.g., between two outlet-audiences "A" and "B," or between two target audiences "1" and "2").

Between two sets of the same type, that we shall refer to as α and β, we can characterize their overlap by determining the following two values:

$$\text{i. overlap}_{\alpha \cap \beta, \alpha} = \frac{|\alpha \cap \beta|}{|\alpha|}$$

$$\text{ii. overlap}_{\alpha \cap \beta, \beta} = \frac{|\alpha \cap \beta|}{|\beta|}$$

When α is an outlet-audience and β is a target audience, the above equations reduce to determinations of, respectively, composition and coverage (as described above in Section 1, "Introduction").

Regarding the determination of the size of an intersection between two sets, it can be determined in at least the following two ways:
1. Determine the intersection, and then count the number of elements in the intersection (already described above).
2. Use set union and subtraction, as follows:
   a. size$_{overlap}$=[|oa$_A$|+|oa$_B$|]−|oa$_A$∪oa$_B$|

Continuing with the example of the previous sub-section (2.2, "Examples"), as a further test, to help the brand manager decide where to advertise, it can be useful to determine the extent to which there is overlap, between the audiences of media outlets "A" and "B."

The overlap can be characterized by finding the fraction (or percentage) of the intersection, between the outlet-audiences:

$$\text{1. overlap}_{A \cap B, A} = \frac{|oa_A \cap oa_B|}{|oa_A|}.$$

$$\text{2. overlap}_{A \cap B, B} = \frac{|oa_A \cap oa_B|}{|oa_B|}.$$

Figure 7A:
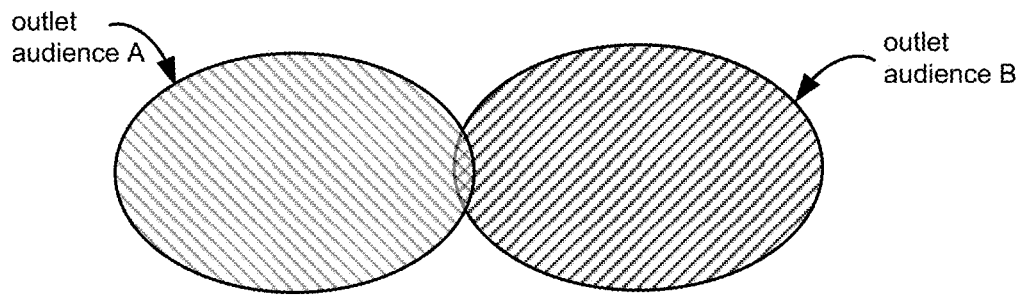
FIGS. 7A-7C depict, with two outlet audiences, three main ways in which to characterize the overlap between two like sets.
Figure 7B:
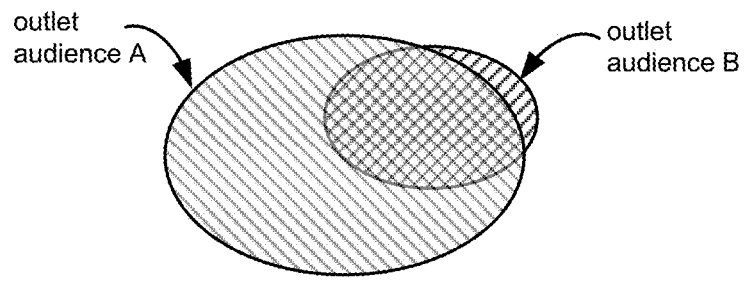
Figure 7C:
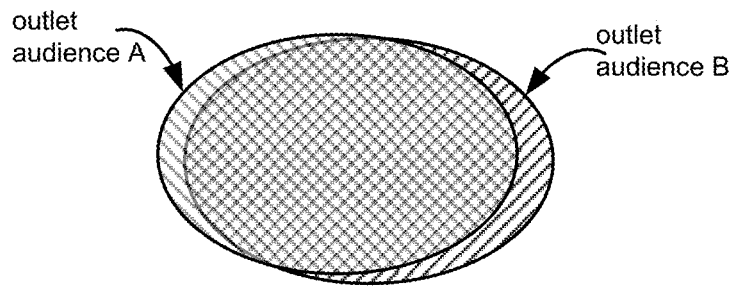

The Venn diagrams of FIGS. 7A-7C depict three main ways in which the percentages can be used:

1. FIG. 7A depicts the situation where the overlap is a small percentage, with respect to both outlet-audiences (i.e., both overlap$_{A \cap B, A}$ and overlap$_{A \cap B, B}$ are small).
2. FIG. 7B depicts the situation where the overlap is a small percentage with respect to one of the outlets (e.g., overlap$_{A \cap B, A}$ is small), but is a large percentage with respect to the other outlet's audience (e.g., overlap$_{A \cap B, B}$ is large).
3. FIG. 7C depicts the situation where the overlap is a large percentage, with respect to the audiences of both the media outlets (e.g., both overlap$_{A \cap B, A}$ and overlap$_{A \cap B, B}$ are large).

The definition of "small" overlap will vary depending upon the circumstances, but, for example, a percentage of 33%, or less, can be a suitable definition.

Similarly, the definition of "large" overlap will vary depending upon the circumstances, but, for example, a percentage of 66%, or more, can be a suitable definition.

In the case of AF 302 and AF 303, the intersection is the empty set (i.e., an AF with all 0's) or union produces size$_{overlap}$=0, showing that the audiences of media outlets "A" and "B" are non-overlapping. At this point in the analysis, the brand manager may well conclude that it is best to advertise on both TV shows.

Figure 17B:
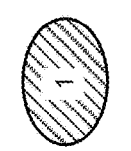
FIG. 17B is the same as FIG. 17A, except that FIG. 17B has an additional user interface, for intersecting sets of the same type.

This possibility, of intersecting sets of the same type, is shown in FIG. 17B. FIG. 17B is the same as FIG. 17A, except that FIG. 17B has an additional row 1714.

As can be seen for row 1714, the checkboxes of columns 1702 in 1703 have been checked, therefore resulting, in column 1704, in an intersection of the audience for TV_show_A with the audience for TV_show_B. Along with a graphical representation of the intersection (actually, the complete lack of an intersection), this subpanel (i.e., the subpanel at the intersection of row 1714 and column 1704) also shows the values for:

The percentage of overlap of A by B, labeled in the figure as "overlap of A" (0%); and
The percentage of overlap of B by A, labeled in the figure as "overlap of B" (also, 0%).

2.4 Inverse Hash Function

Figure 4:
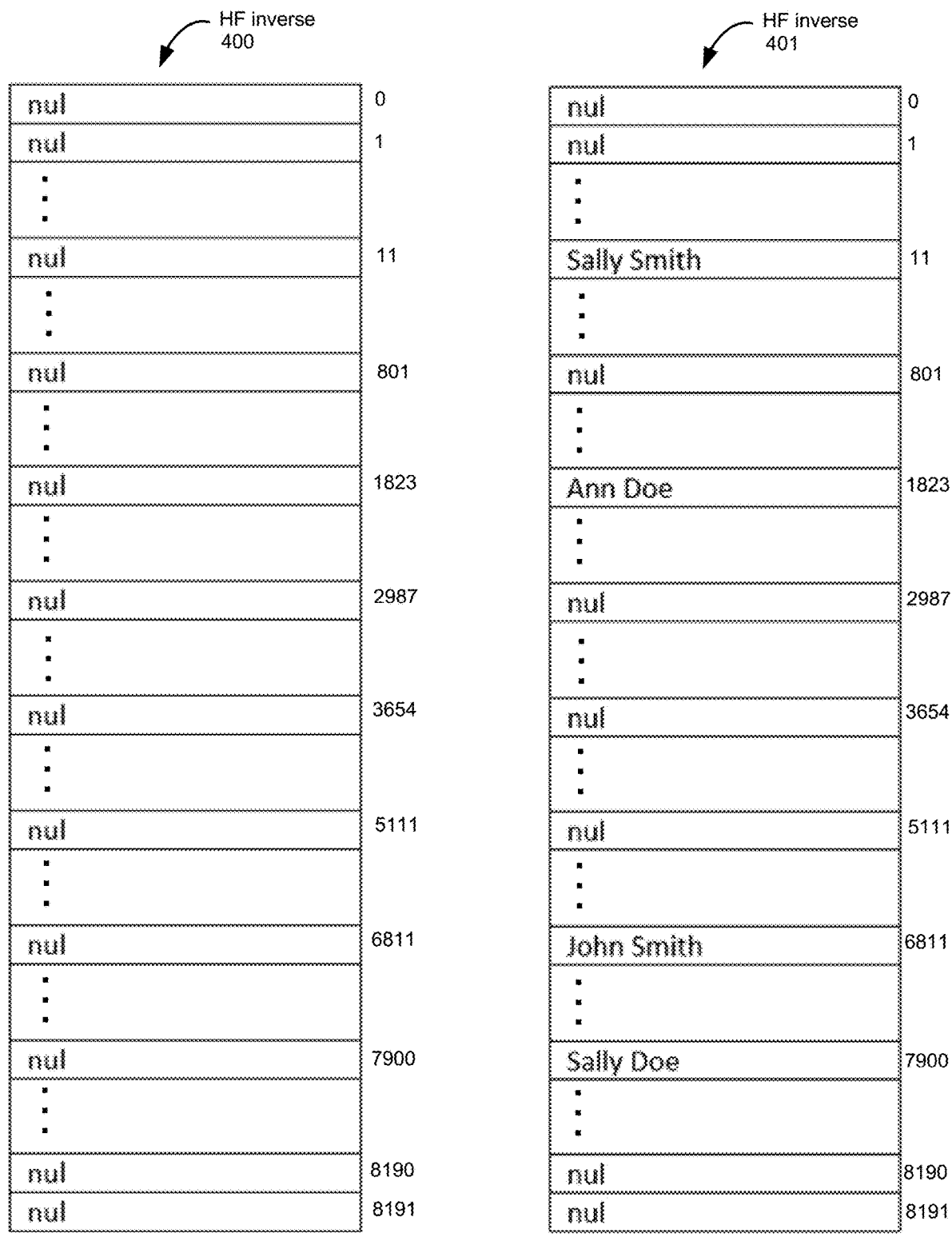
FIG. 4 shows an inverse hash function, after it has been initialized and after it has been programmed to reverse map for the names of SM_db 200.

Once an audience-fingerprint has been produced, as a result of any operation or operations, it may be useful to map backwards, and see the Author ID's represented. FIG. 4 shows an inverse hash function (symbolically, HF inverse), from which a mapping back to Author ID's can be accomplished.

Specifically, FIG. 4 shows an array 400 that is the same as any one audience-fingerprint (i.e., accepts a number of index values equal to maxval_HF), except that, at each indexed location, rather than storing a single bit, sufficient data can be stored to uniquely identify any possible author-identifier. Each location of an HF inverse can be large enough, for example, to directly store any author-identifier (e.g., each location can store up to 50 characters). Another possibility, is that each location of HF inverse can store a unique pointer to a location where the full, corresponding, author-identifier is stored. Array 400 shows an HF inverse just after it has been initialized, to specify a null value at each location, and before any reverse-mapping capability has been added. Array 401 shows an inverse for HF$_{8192}$, that is able to map backwards for each of the four Author ID's that appear in SM_db 200.

An HF inverse can be built as part of the process of creating each audience-fingerprint with which it may later be used. For example, each time a location of an audience-fingerprint, at an index value "v," is set to "1," the same location in HF inverse can be set to store the author-identifier that was hashed to produce the index value "v."

As an even more specific example, consider AF 301 of FIG. 3A. When the author-identifier "Sally Smith" is hashed to produce the value of 11, in addition to setting location 11 of AF 301 to "1," location 11 of HF inverse 401 can be set to the value "Sally Smith."

Continuing with the example of the previous two sections (2.2, "Examples," and 2.3, "Overlap Between Like Sets"), the brand manager may wish to understand why there is no overlap between TV_show_A and TV_show_B. The HF inverse may help a brand manager with this problem, by allowing him/her to specifically identify at least some of the persons included in an outlet's audience. Application of HF inverse 401 to AF 302 reveals that all members of the outlet-audience for TV_show_A are male (i.e., John Smith is the sole member of AF 302). Application of HF inverse 401 to AF 303 reveals that all members of the outlet-audience for TV_show_B are female (i.e., the outlet-audience's members are Sally Smith, Ann Doe, and Sally Doe).

Figure 17C:
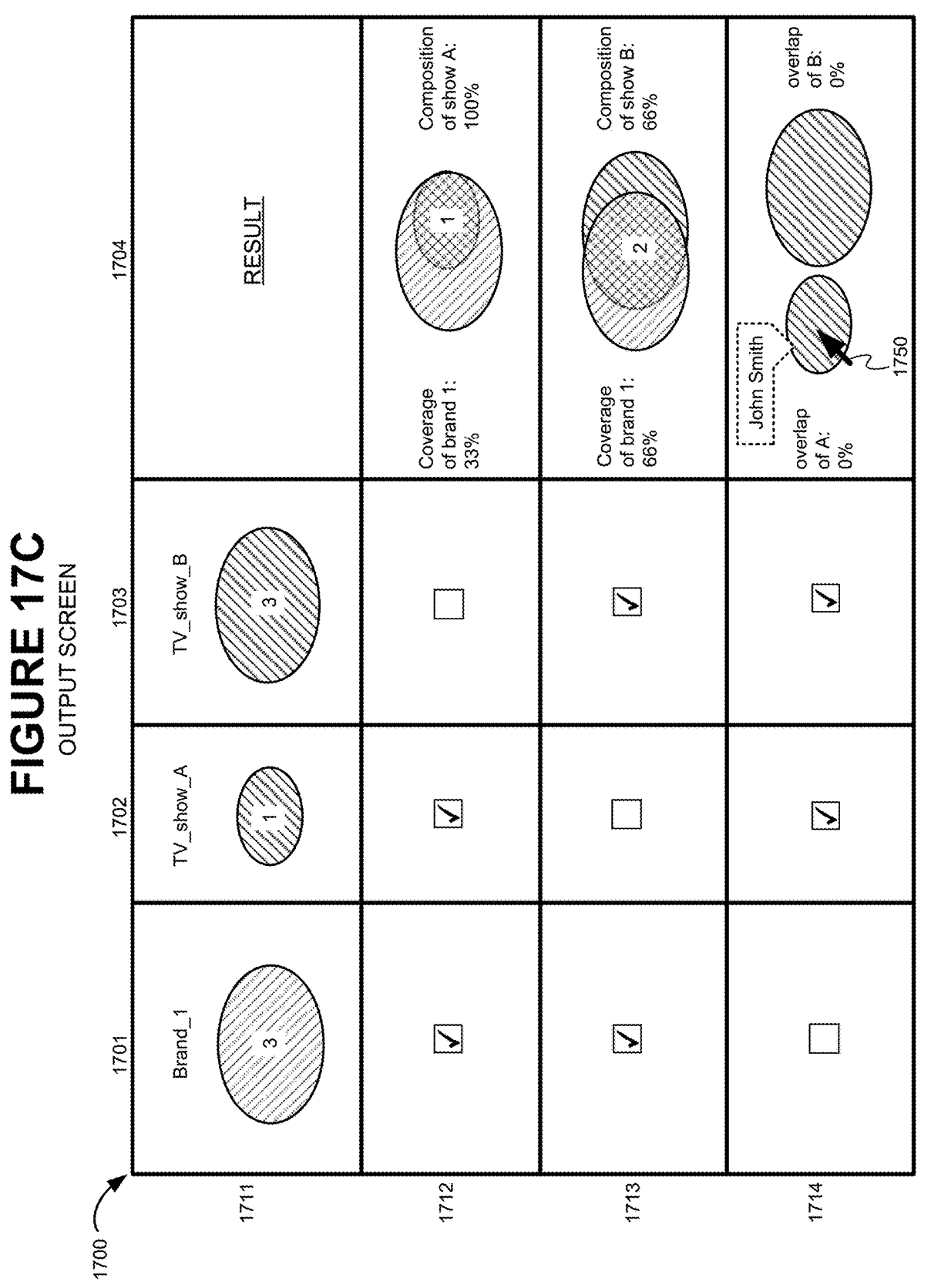

This possibility, of using an inverse hash function to map back, from an audience fingerprint to the actual authors it represents, is shown in FIG. 17C. FIG. 17C is the same as FIG. 17B, except that FIG. 17C shows mouse pointer 1750 as having selected the audience for TV_show_A, in the result subpanel (i.e., the subpanel at the intersection of row 1714 and column 1704). It is assumed that pointing to any audience shown in FIG. 17C results in an invocation of inverse hash function 401 (as shown in FIG. 4). In the case of the audience fingerprint for TV_show_A, this results in mapping the single location, that has an indicator of an author-identifier being present (i.e., location 6811), back to the original author-identifier that had been hashed in order to set that location (i.e., the author-identifier "John Smith"). The author-identifiers, located for an audience fingerprint, can be displayed in a pop-up window, that appears next to the indicated audience. As can be seen in FIG. 17C, the pop-up window for the audience fingerprint of TV_show_A shows the single author-identifier it contains: John Smith.

3 Further Analysis 3.1 Between Target Audience and Outlet Audience

Figure 5A:
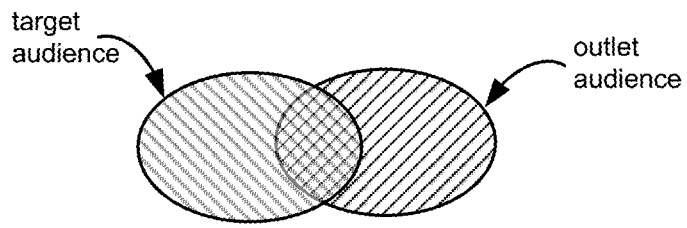
FIGS. 5A-5D show four main categories of overlap, between a target audience and an outlet-audience.
Figure 5B:
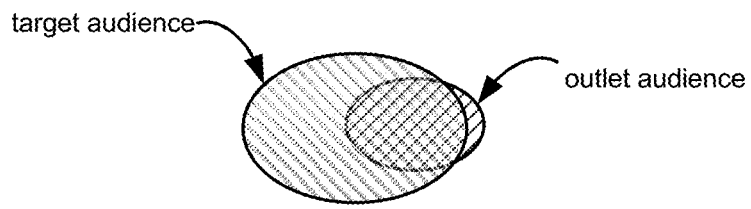
Figure 5C:
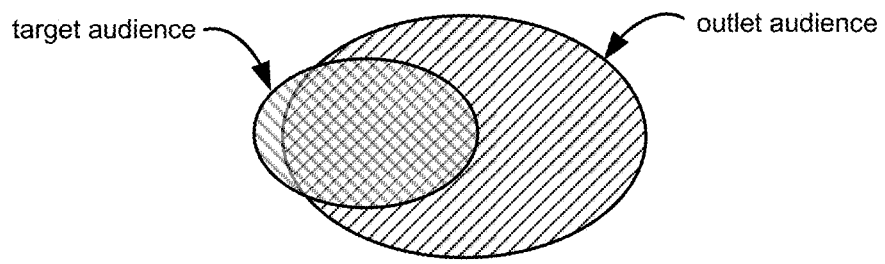
Figure 5D:
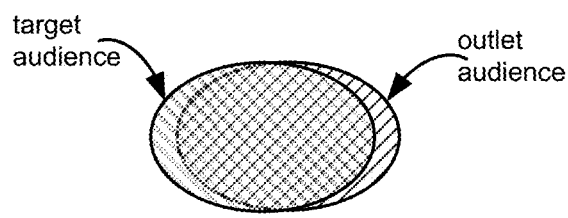

Regarding the example audience-fingerprints 301, 302, and 303, discussed above in section 2.2 with respect to FIGS. 3A-3C, the relationships between the target audience for brand$_1$, and outlet audiences for TV_show_A and TV_show_B, is more generally shown in the Venn diagrams of FIGS. 5B and 5D.

In particular, the relationship between the target audience for brand$_1$ and TV_show_A is shown in FIG. 5B. The high composition value (i.e., composition$_{1,A}$=100%) is reflected by the fact that the target audience of FIG. 5B covers nearly all of the outlet audience (in fact, to be completely accurate, the target audience should completely cover the outlet audience). The low coverage value (i.e., coverage$_{A,1}$=33%) is reflected by the fact that the outlet audience of FIG. 5B covers only a small portion of the target audience.

The relationship between the target audience for brand$_1$ and TV_show_B is shown in FIG. 5D. The high values for composition and coverage (i.e., composition$_{1,B}$=66% and coverage$_{B,1}$=66%) are indicated by the large amount of overlap in FIG. 5D. In particular, only one author-identifier of the target audience for brand$_1$ is not covered by the outlet-audience of TV_show_B (i.e., only "John Smith" of the target audience is not covered), and only one author-identifier of the outlet-audience of TV_show_B is not covered by the target audience for brand$_1$ (i.e., only "Sally Doe" of the outlet audience is not covered).

Other possible relationships, between a target audience and an outlet-audience, are shown in the Venn diagrams of FIGS. 5A and 5C. FIG. 5A depicts the situation where composition and coverage are both low (e.g., at or less than 33%). FIG. 5C shows the situation where the composition of an output audience is low (e.g., at or less than 33%), but coverage of the target audience, by the outlet audience, is quite high (e.g., at or greater than 66%).

The four main categories of overlap as shown in FIGS. 5A-D, and the implications each category has, for the relative values of composition and coverage, are mapped into a two-dimensional display in FIG. 15A. FIG. 15A does this by assigning coverage level to vertical axis 1530 and composition level to horizontal axis 1531. A high level, with respect to coverage, is represented by horizontal line 1520, while a low level of coverage is represented by horizontal line 1522. A high-level, with respect to composition, is represented by vertical line 1523, while a low level of composition is represented by vertical line 1521. The upper left quadrant of FIG. 15A contains the intersection of lines 1520 and 1521 (i.e., coverage and low composition).

Proceeding clockwise from the upper left quadrant, the correspondence of each quadrant, to one of FIGS. 5A-D, is as follows:

Upper left quadrant: corresponds to FIG. 5C.
Upper right quadrant, at the intersection of lines 1520 and 1523: corresponds to FIG. 5D.
Lower right quadrant, at the intersection of lines 1522 and 1523: corresponds to FIG. 5B.
Lower left quadrant, at the intersection of lines 1522 and 1521: corresponds to FIG. 5A.

Overall, we can refer to a two-dimensional display, of the type shown in FIG. 15A, as a "composition-coverage map."

Figure 15B:
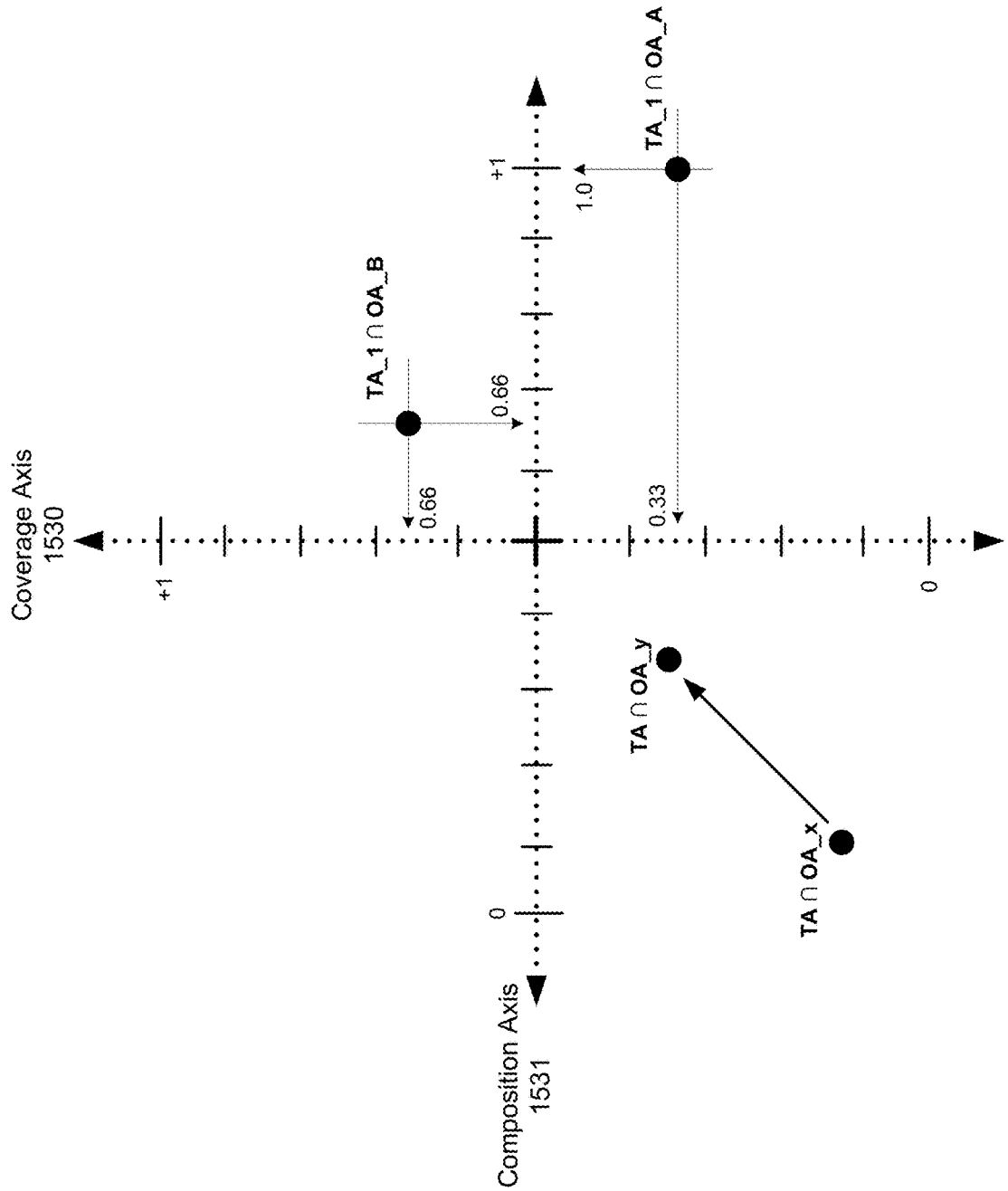
FIG. 15B depicts example ways in which a composition-coverage map can be used as a basis for comparison, with each type of affinity represented by a circle.

FIG. 15B depicts example ways in which a composition-coverage map can be used as a basis for comparison. The example affinities discussed above in section 2.2 are the following: $oa_A \cap ta_1$ and $oa_B \cap ta_1$. As can be seen in FIG. 15B, each of these has been represented as a circle placed at the correct location with respect to the axes.

More generally, if one is looking to choose between using a media outlet "x" or a media outlet "y," with respect to a target audience, if media outlet y has both better composition and coverage than media outlet x, media outlet y should be chosen over x. This general situation is represented in the lower left quadrant of FIG. 15B, and can be seen as a choice of the point that is, relative to the other point, further in the upper left direction. For other relationships, between an outlet x and y, the choice may be less clear. This is the case with affinities $oa_A \cap ta_1$ and $oa_B \cap ta_1$, since the two affinities represent trade-offs, between better composition or better coverage.

To assist in choosing between affinities, a composition-coverage map can be augmented, to have each plotted "point" convey additional information. As has already been suggested with respect to FIG. 15A, for example, each plotted "point" can be a to-scale Venn diagram, representing the sizes of the target audience, outlet audience, and their intersection. Another approach is shown in FIG. 15C, where the radius of each plotted point is varied (according to an appropriate function) in accordance with the size of the outlet audience. Thus, since the size of outlet audience "B" is greater than outlet audience "A" (referring to the example affinities of section 2.2, where "B" has 3 elements and "A" just 1), the plotted circle for outlet audience "B" is shown as having a larger radius r3, compared with radius r1 for outlet audience "A."

More generally, when an affinity is mapped to a composition-coverage map, any appropriate graphical shape can be used. One or more dimensions of the graphical shape can vary according to a selection of one or more of the values that characterize an affinity, including the size of the outlet audience (already discussed above), the size of the target audience, and/or the size of the affinity.

3.2 Between Target Audiences

As discussed above in Section 2.3 ("Overlap Between Like Sets"), it can be useful to measure the amount of overlap between sets of the same type. This includes the case where the sets are two target audiences:

1. A target audience 1 for a brand$_1$, and
2. A target audience 2 for a brand$_2$.

The overlap can be characterized by finding the fraction (or percentage) of the intersection, with respect to each target audience:

1. $\text{overlap}_{1 \cap 2, 1} = \dfrac{|ta_1 \cap ta_2|}{|ta_1|}$.

2. $\text{overlap}_{2 \cap 1, 2} = \dfrac{|ta_1 \cap ta_2|}{|ta_2|}$.

Figure 6A:
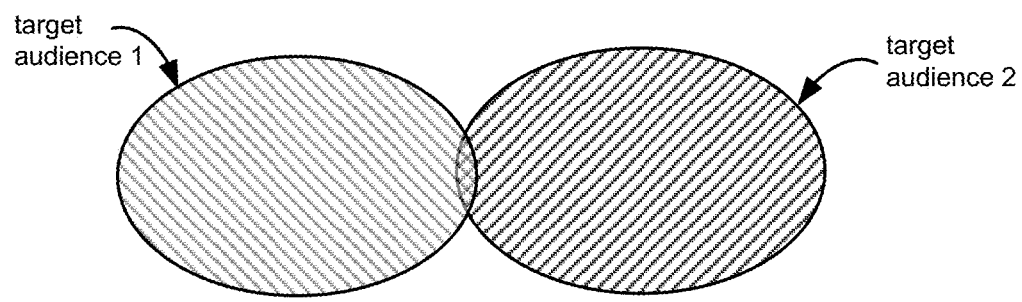
FIGS. 6A-6C depict, with two target audiences, three main ways in which to characterize the overlap between two like sets.
Figure 6B:
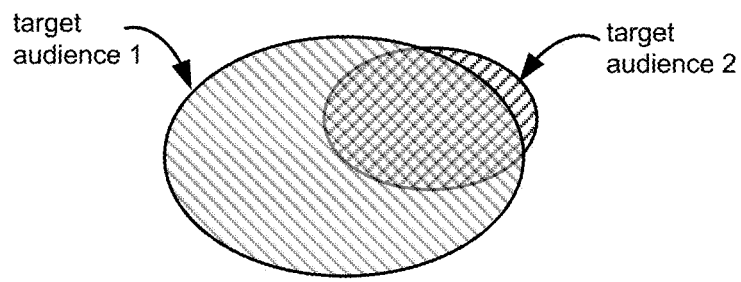
Figure 6C:
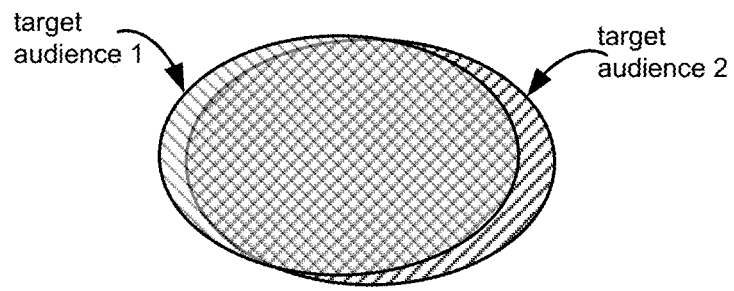

Like FIGS. 7A-7C, the Venn diagrams of FIGS. 6A-6C depict three main ways in which the percentages can be used:

1. FIG. 6A depicts the situation where the overlap is a small percentage, with respect to both target audiences (i.e., both $\text{overlap}_{1 \cap 2, 1}$ and $\text{overlap}_{2 \cap 1, 2}$ are small).
2. FIG. 6B depicts the situation where the overlap is a small percentage with respect to the target audience for brand$_1$ (e.g., $\text{overlap}_{1 \cap 2, 1}$ is small), but is a large percentage with respect to the other brand's audience (e.g., $\text{overlap}_{2 \cap 1, 2}$ is large).
3. FIG. 6C depicts the situation where the overlap is a large percentage, with respect to the audiences of both the brands (e.g., both $\text{overlap}_{1 \cap 2, 1}$ and $\text{overlap}_{2 \cap 1, 2}$ are large).

The composition-coverage map, introduced in the previous section (Section 3.1, "Between Target Audience and Outlet Audience"), can be generalized, as a way to characterize the overlap between any two sets, including the overlap between sets of the same type. As was discussed above, with respect to Section 2.3, the overlap between any two sets $\alpha$ and $\beta$, can be characterized by the following two expressions:

i. $\text{overlap}_{\alpha \cap \beta, \alpha} = \dfrac{|\alpha \cap \beta|}{|\alpha|}$.

ii. $\text{overlap}_{\alpha \cap \beta, \beta} = \dfrac{|\alpha \cap \beta|}{|\beta|}$.

With regard to the arrangement of axes, shown in FIG. 15A, Coverage Axis 1530 (or, more generally, the vertical axis) can be changed to represent $\text{overlap}_{\alpha \cap \beta, \alpha}$, and Composition Axis 1531 (or, more generally, the horizontal axis) can be changed to represent $\text{overlap}_{\alpha \cap \beta, \beta}$. Alternatively, depending upon the particular application, $\text{overlap}_{\alpha \cap \beta, \alpha}$ can be assigned to the horizontal axis, and overlap$_{\alpha \cap \beta, \beta}$ can be represented by the vertical axis.

3.3 Libraries of Pre-Computed Audiences

As has been discussed above (e.g., Section 2.1, "General Structure"), as long as the hash function used to produce collections (or libraries) of audience-fingerprints remains constant, any selection of audiences can always be evaluated against any other selection of audiences. This is because, for any bit at an index "v" that is set in any audience-fingerprint, we can assume it is representative of a same author being present.

This potential, for the stability and reusability of audience-fingerprints, can encourage the production of audience-fingerprint libraries.

While the above examples, for use of audience-fingerprints, involve only one or two brands and/or one or two media outlets, it can readily be appreciated that there are many realistic situations where many more brands and/or media outlets can be involved.

If considered at the company level, rather than the brand manager level, there are many companies where brands number in the 10's or even 100's. This is particularly true if, for example, the definition of "brand" is broadened to include sub-brands, which is an approach to (at least) consumer products that has become increasingly popular. In such cases, a brand manager (or brand-producing company) has the option of using the techniques of the present invention to pre-compute many target audiences. Even for the case of a single brand, a thorough evaluation of its marketing potential can include the definition of many target audiences. This can be especially true when one wishes to make searches that are not tied to a particular product, some of the categories for which (as discussed above, Section 1) include:

- any of a wide variety of demographics that may be considered important;
- interest in categories of products;
- searches related to the life stage of the author; and
- any of a wide variety of psychographics.

Similarly, a single company (such as a television network) may be responsible for many media outlets, each of which can have its own type of audience. Even for a single media outlet, a thorough evaluation of its ability to message various brands can require a determination of many outlet-audiences. As with target audiences, as long as the hash function used remains constant, the outlet-audiences can always be evaluated against any appropriate set of target audiences.

For either a brand-producing company or a provider of multiple target audiences, the ability to keep many pre-computed audience-fingerprints results in similar advantages: an ability to act more quickly. In the case of a brand-producing company, if there is a desire to evaluate alternative media outlets, this can be done quickly, since the target audiences are already available. Similarly, in the case of a network, if a new potential customer is interested in using the network as a media outlet, this can also be done more quickly, since the outlet-audiences are already available. If it is the case that both the brand-producing company and the network have pre-computed, respectively, their target audiences and outlet-audiences, then a thorough evaluation, of the entire potential for working together, can be done extremely quickly.

Because, in a preferred embodiment, only a small amount of data (e.g., a single bit) is stored at each index location of an audience-fingerprint, and because, when not being used, audience-fingerprints can be stored as compacted sparse arrays, it is entirely feasible, with ordinary current computing capacity, to store many of such pre-computed audience-fingerprints.

Once a library of audiences have been determined, it may even be desirable to apply such audiences to search results having nothing to do with brand management.

3.4 Three or More Target Audiences and/or Outlet Audiences

As a discussed in the previous section (Section 3.3), the techniques described herein can be applied to audience collections of any size.

In this section we discuss as a specific example, in conjunction with FIG. 8, three target audiences being compared with three outlet audiences.

This can occur, for example, where a brand manager is responsible for three different brands (or, perhaps, three different sub-brands of the single main brand), presented herein as simply being named brands 1, 2, and 3. For each of these brands a target audience has been determined, as shown in the leftmost column. Each target audience is represented, in this leftmost column, by an oval with cross-hatching sloping downwards, when proceeding left to right.

Three media outlets are being considered, presented herein as simply being named A, B, and C. The three media outlets can each be operated by a separate company, or, for example, they could be three different television shows all being shown on a same network. For each of these outlets an outlet audience has been determined, as shown in the topmost row. Each outlet audience is represented, in this topmost row, by an oval with cross-hatching sloping upwards, when proceeding left to right.

As discussed above more generally (Section 3.3, "Libraries of Pre-Computed Audiences"), to the extent the target audiences and outlet-audiences have been pre-computed, the analysis of FIG. 8 can be done more quickly. Even if none of the target audiences or outlet-audiences have been pre-computed, the present invention includes automated techniques that will still enable an analysis, such as that of FIG. 8, to be done much more quickly than was conventionally possible.

By examining the nine boxes of the analysis (in which every possible combination of a single target audience in conjunction with a single outlet-audience is considered), it can be seen that a brand manager may regard advertising on media outlet A as most efficient. This is because, with respect to the target audiences of all three brands (i.e., of brands 1, 2, and 3), there is substantial overlap with the audience of media outlet A. It can also be readily appreciated that the audience for media outlet B, regardless of the composition of its overlap with a target audience, is smaller than the audience for media outlet A. Thus, even in the case of target audience 2, where the composition of the audience for media outlet B is very high, the coverage of target audience 2 is still low, in comparison to the coverage provided by the audience for media outlet A.

Conversely, it can be readily appreciated that the audience for a media outlet C is larger than the audience for a media outlet A. Despite its greater size, in no case does media outlet C achieve greater coverage of a target audience than media outlet A. At the same time, because the audience for a media outlet C is larger, all other aspects being equal, media outlet C is likely to be more expensive than media outlet A, while providing little or no advantage in terms of target audience coverage.

Figure 9C:
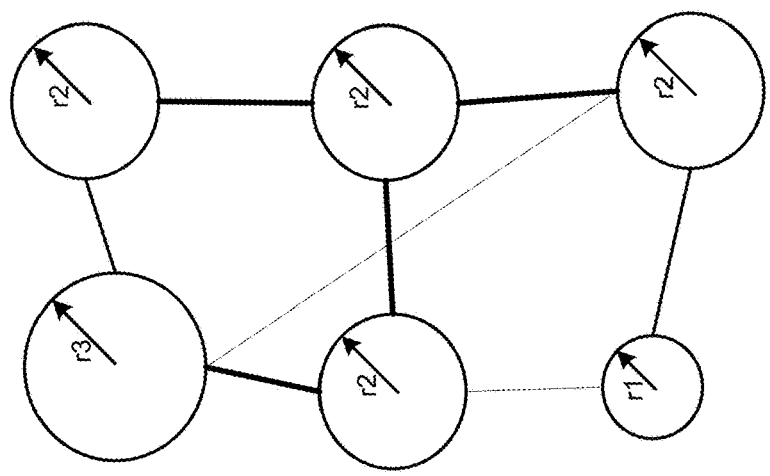
FIG. 9C is the same as FIG. 9A, except measurements of node radii are shown.

As an alternative to Venn-type diagrams, sets, and the intersections between sets, can be represented by a diagram comprised of, respectively, nodes and edges. By adding simulation of attractive and repulsive forces, to such diagrams, the result is what we shall refer to herein as a "force-directed" graph. FIG. 9A depicts an example force-directed graph representation of the Venn diagrams of FIG. 8. In FIG. 9A, each set of FIG. 8 is represented by a node, and each intersection is represented by an edge. Each node is assigned a same level of repulsive force, such as by simulating each node as having the same polarity and magnitude of electric charge. Each edge is assigned a level of attractive force, the magnitude of the attractive force varying with the size of the set intersection it represents. While the nodes of FIG. 9A vary in size, such size is present only for purposes of graphical representation to the user, such that a user can appreciate the relative size of the sets involved, and the size differences do not reflect a difference in the level of repulsion between nodes. The variation in thickness of the edges, however, serves two purposes:

1. Graphical representation to the user, such that a user can appreciate the relative size of the intersection sets involved.
2. Graphical representation of the amount of attractive force, an edge exerts between the nodes it connects.

Figure 9B:
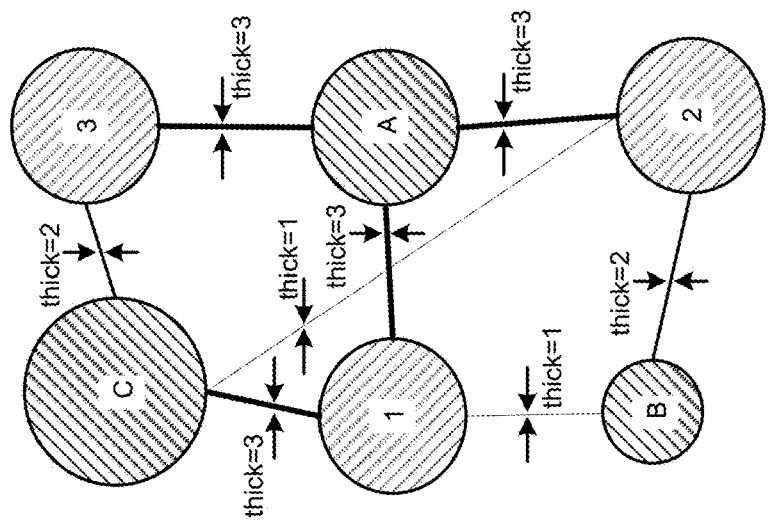
FIG. 9B is the same as FIG. 9A, except measurements of edge thickness are shown.
Figure 9A:
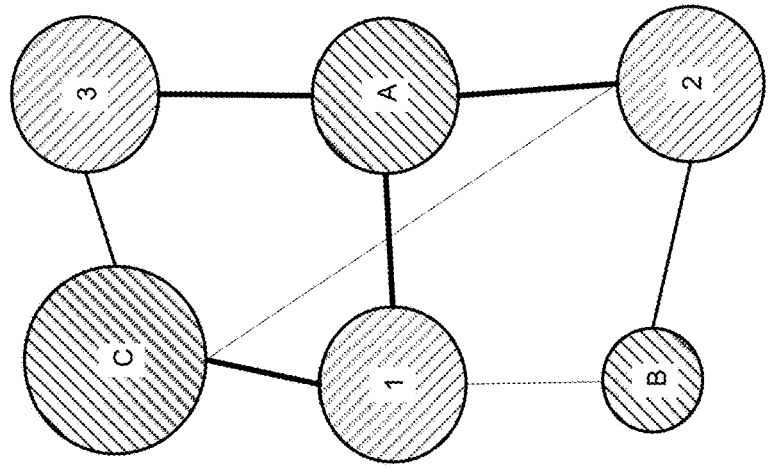
FIG. 9A depicts an example force-directed graph representation of the Venn diagrams of FIG. 8.

An examination of FIG. 9B shows that edge thickness has been categorized into levels 1, 2, and 3, where an increase in edge thickness indicates both an increase in the number of elements, of a set of intersection, and an edge that exerts greater attractive force, between the nodes it connects. Similarly, an examination of FIG. 9C shows that node radii have been categorized into levels 1, 2, and 3, where an increasing node radius number indicates a set containing more elements.

Any suitable function, that takes a number of elements as its input, can be used for assigning a radius to a node or a thickness (and attractive force) to an edge. If an audience fingerprint $AF_i$ represents "x" elements, two example mathematical functions, for determining a suitable node radius or edge thickness, are:

Log(x), or x/c, where "c" is a scaling constant.

It will be appreciated that FIG. 9A can be easier to interpret than FIG. 8. For example, FIG. 9A visually depicts outlet audience A as closer to all three of the target audiences, than is either outlet audience B or outlet audience C.

In addition to performing set operations between audience-fingerprints of different types (i.e., of type "target audience" and of type "outlet-audience"), set operations can be performed between any number of audience-fingerprints of the same type.

Figure 10B:
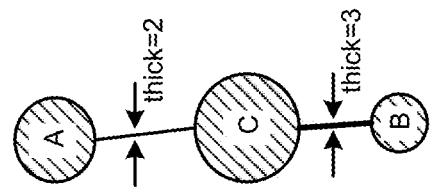
FIG. 10B is a force-directed graph representation of FIG. 10A.
Figure 10A:
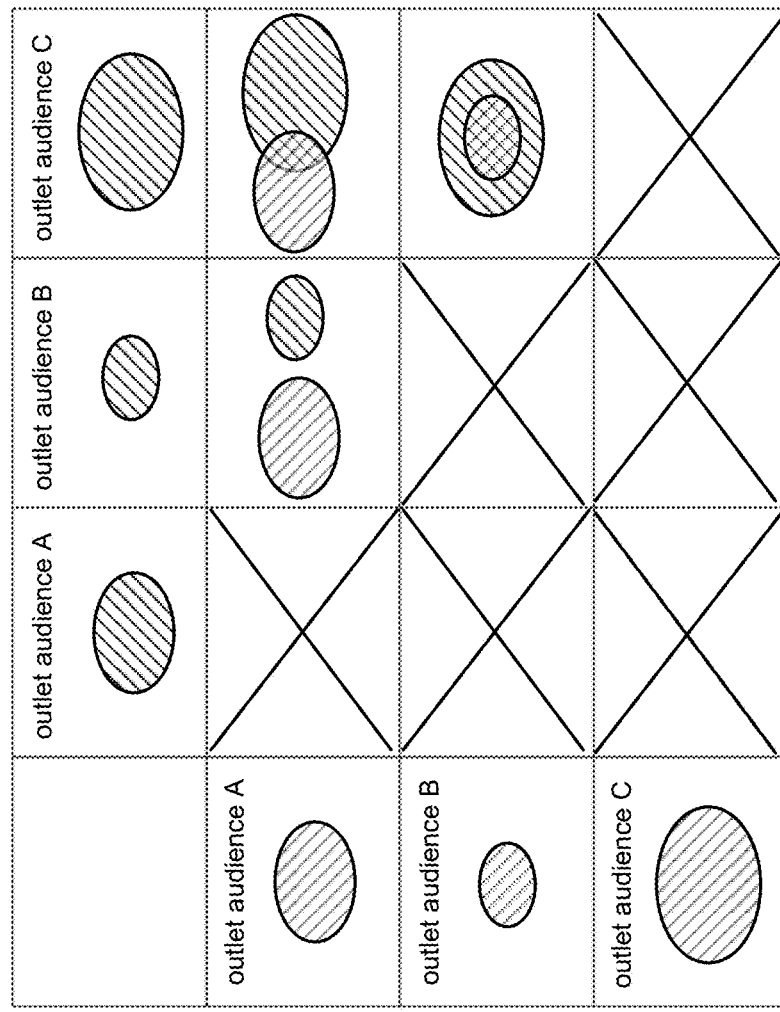
FIG. 10A is a modification of FIG. 8, for the case of 3 like sets being compared against themselves.

For example, FIG. 10A is the same as FIG. 8, except the leftmost column (of target audiences 1, 2, and 3) is replaced by outlet audiences A, B, and C. In this way, each outlet audience can be compared against each other outlet audience. As can be seen in FIG. 10A, when comparing a set of audience-fingerprints to itself, some of the comparisons will not be meaningful (i.e., when an audience-fingerprint is compared to itself), while others are redundant (e.g., comparing outlet audience B of the second row to outlet audience A of the first column, is redundant to comparing outlet audience A of the first row to outlet audience B of the second column). In FIG. 10A, these non-meaningful or redundant comparisons are X'ed out.

Just as FIG. 9A is a force-directed graph representation of FIG. 8, FIG. 10B is a force-directed graph representation of FIG. 10A:

No edge is present, between nodes A and B, because outlet audiences A and B have no overlap (in FIG. 10A, see the intersection of the row for outlet audience capital A with the column for outlet audience B).

A thicker edge is shown between nodes C and B, than between nodes A and C, because there is greater overlap between outlet audiences C and B (in FIG. 10A, see the intersection of the row for outlet audience B with the column for outlet audience C) than there is between outlet audiences A and C (in FIG. 10A, see the intersection of the row for outlet audience A with the column for outlet audience C).

From either FIG. 10A or 10B, potentially helpful additional information, for a media planner, is uncovered. Specifically, while FIGS. 8 and 9A show that outlet audience A is likely to be a more efficient channel, for dissemination of information to target audiences 1, 2, and 3, FIGS. 10A and 10B show that there may be some previously unsuspected advantages to also utilizing media outlet C. This is because, outlet audience C is shown to overlap outlet audience A and completely cover the outlet audience B. Thus, if a media planner is able to choose more than one of the outlet audiences, he/she should choose, at most, outlet audiences A and C (as outlet audience B is completely redundant with respect to C).

While FIGS. 10A and 10B address the situation of three or more outlet audiences being compared against each other, it can be readily appreciated that by simply substituting, a set of all target audiences for a set of all outlet audiences, the same techniques can be applied to the situation of three or more target audiences.

Particularly if a force-directed graph is complex, the following technique can be useful. When a node of current interest is selected, the selected node can be highlighted, along with any nodes directly connected to the selected node. In addition, the edges, connecting the selected node to its directly-connected nodes, can also be highlighted. The highlighting can be accomplished using any suitable graphical technique, such as adjusting shading and/or colors.

Figure 9D:
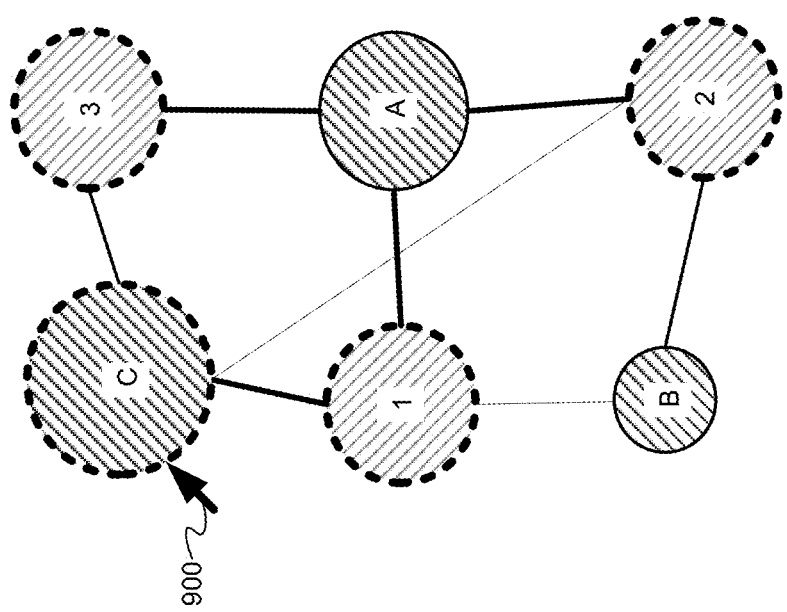
FIG. 9D is the same as FIG. 9A, except there is highlighting, of a selected node, and of nodes directly-connected to the selected node.

For example, FIG. 9D is the same as FIG. 9A, except for the following. A mouse-pointer 900 is shown as having selected node C has the node of current interest. Node C has been highlighted by very substantially darkening its circular outline, and by breaking the outline into dashes. Also, since nodes 1, 2, and 3 are directly connected to node C, these nodes have also been highlighted. The same graphical techniques, used to highlight node C, have been applied to nodes 1, 2, and 3.

3.5 Measuring Affinity Over Time

By keeping the searches, from which target audience and/or outlet-audience determinations are made, constant, but by applying such searches to two or more SM_db's, where the difference between the database's is the applicable time period, variations over time can be measured.

Figure 12A:
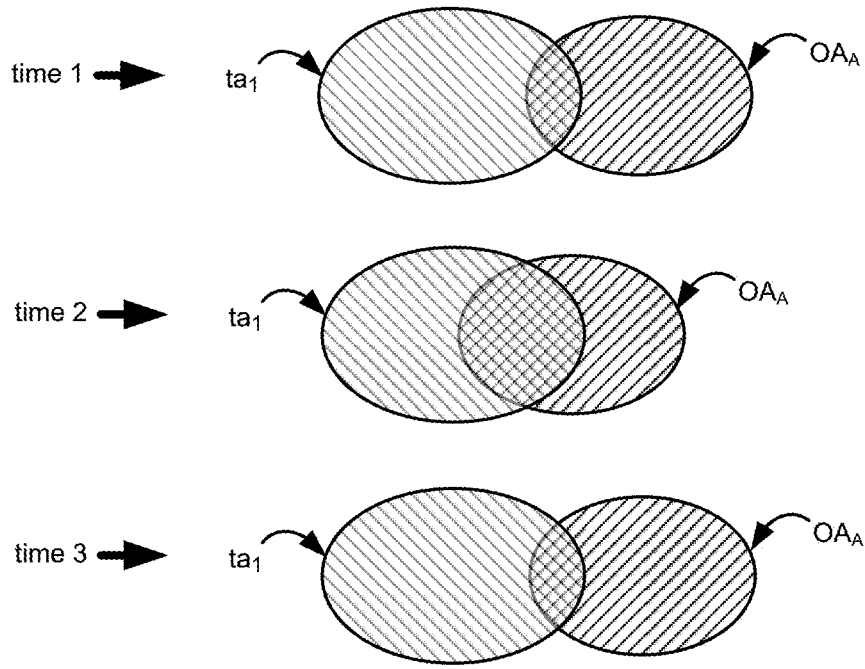
FIG. 12A depicts, at three different time intervals, the affinity between a pair of sets, where the pair consists of sets of differing type.
Figure 12B:
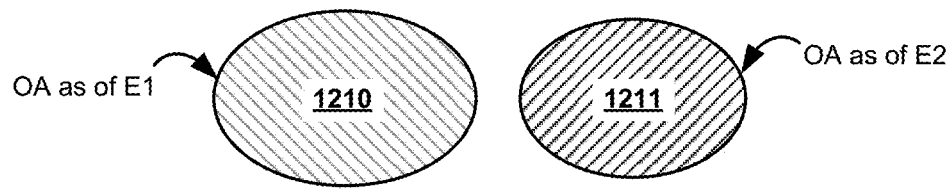
FIGS. 12B-12C depict a way to compare a set, at a particular time interval, against itself at another time interval.
Figure 12C:
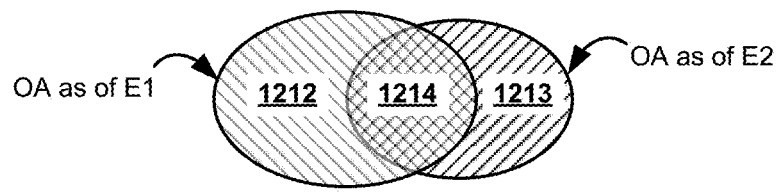

This section focuses on two approaches, to measuring changes in affinity over time, as shown in FIGS. 12A-C:

1. FIG. 12A: depicts, at three different time intervals, the affinity between a pair sets, where the pair consists of sets of differing type. More specifically, the intersection is found between a target audience $ta_1$ and an outlet audience $oa_A$. This same affinity is determined at three different time intervals: time 1, time 2, and time 3. Thus, for example, the $ta_1$ and $oa_A$ determined for interval time 1 is likely based upon the same kind of search queries used to produce $ta_1$ and $oa_A$ for interval time 2. The difference is that the $ta_1$ and $oa_A$ for interval time 1 are produced by applying those queries to an SM_db that only contains posts posted during time 1, while the $ta_1$ and $oa_A$ determined for interval time 2 are produced by applying those queries to an SM_db that only contains posts posted during time 2.

2. FIGS. 12B-C: In FIG. 12B, depicts a first set 1210 that is to be compared against a second set 1211, where the first and second sets are identical, except for the fact that the first set is based upon posts posted during a first time interval and the second set is based upon posts posted during a second and later time interval. Specifically, FIG. 12B shows two different outlet-audiences:
   a. An outlet-audience for an episode 1 ("or E1"), also indicated as set 1210.
   b. An outlet-audience for an episode 2 ("or E2"), also indicated as set 1211.

The audience for E1 differs from the audience for E2 in only the following way: the audience for E1 is based upon posts posted during a time interval earlier than the time interval that serves as the basis for the audience of E2. FIG. 12C depicts the three resulting subsets produced, when 1210 and 1211 are intersected:
   a. Subset 1214: This is the intersection of 1210 and 1211 (or, using the alternate names, the intersection of the oa for E1 and the oa for E2).
   b. Subset 1212: This is the set 1210, minus intersection 1214.
   c. Subset 1213: This is the set 1211, minus intersection 1214.

Interpretation of these three subsets, in terms of audience change over time, is as follows:
   a. Subset 1212: Represents the members of the audience for E1, who did not remain audience members for episode E2.
   b. Subset 1214: Represents the members of the audience for E1, who remained as audience members for episode E2.
   c. Subset 1213: Represents audience members of E2 who are new, with respect to the audience of E1.

Summarized more simply, the three subsets can be characterized as follows. In going from episode E1 to episode E2:
   a. Lost audience is represented by subset 1212.
   b. Maintained audience is represented by subset 1214.
   c. Gained audience is represented by subset 1213.

Each of the following two sub-sections (3.5.1 and 3.5.2) presents an example of each of the two approaches.

3.5.1 Between Target Audience and Outlet Audience

An example situation where variation over time is important, between sets of differing types, is the demonstration of advertising effectiveness. It can be extremely important, to a media outlet, to be able to demonstrate the effectiveness of the advertising it presents.

Given a media outlet "A" with an outlet-audience $oa_A$, and a brand "1" with the target audience of $ta_1$, the effectiveness, of advertising brand 1 on outlet A, can be demonstrated as follows:

1. The composition of $oa_A$ with respect to $ta_1$ can be determined, for the four week period (the four-weeks referred to as "m") during which an advertising campaign is conducted on outlet A. Symbolically, we can refer to this composition value as $composition_m$.
2. Symbolically, we can refer to the four weeks immediately preceding the advertising campaign as m−1. The composition of $oa_A$ with respect to $ta_1$ can also be determined for m−1. This composition value can be referred to as $composition_{m-1}$.
3. Symbolically, we can refer to the four weeks immediately after the advertising campaign as m+1. The composition of $oa_A$ with respect to $ta_1$ can also be determined for m+1. This composition value can be referred to as $composition_{m+1}$.

In order to make this example even more concrete, media outlet A can be a television show, and brand 1 can be a movie (a "movie 1") that is playing in theaters. The network, that broadcasts television show A, would like to demonstrate that the four weeks of advertising, for movie 1, has had a positive effect.

Suppose the following table of data is collected:

| 4 week period | $oa_A$ | $ta_1$ | $oa_A \cap ta_1$ |
| --- | --- | --- | --- |
| m−1 | 138,934 | 991 | 54 |
| m | 79,451 | 4680 | 105 |
| m + 1 | 75,265 | 2773 | 31 |

The following compositions can be determined:

1.
$$composition_{m-1} : \frac{54 \times 10^0}{13.8934 \times 10^4} = 3.89 \times 10^{-4},$$

in units of members-of-overlap per member-of-outlet-audience. Multiplying by $10^4$ yields the more intuitively understandable composition value of 3.89, expressed in units of members-of-overlap per 10,000 members-of-outlet-audience.

2.
$$composition_m : \frac{105 \times 10^0}{7.9451 \times 10^4} = 13.22 \times 10^{-4}$$

members-of-overlap per member-of-outlet-audience, or 13.22 members-of-overlap per 10,000 members-of-outlet-audience.

3.
$$composition_{m+1} : \frac{31 \times 10^0}{7.5265 \times 10^4} = 4.12 \times 10^{-4}$$

members-of-overlap per member-of-outlet-audience, or 4.12 members-of-overlap per 10,000 members-of-outlet-audience.

As can be seen, the composition of television show A, with respect to the target audience of movie 1, increased dramatically (by a factor of over 3×) during the four weeks in which movie 1 was advertised on television show A. In the four weeks after the advertising ended, composition dropped back to approximately the same level existing before the advertising.

Figure 11:
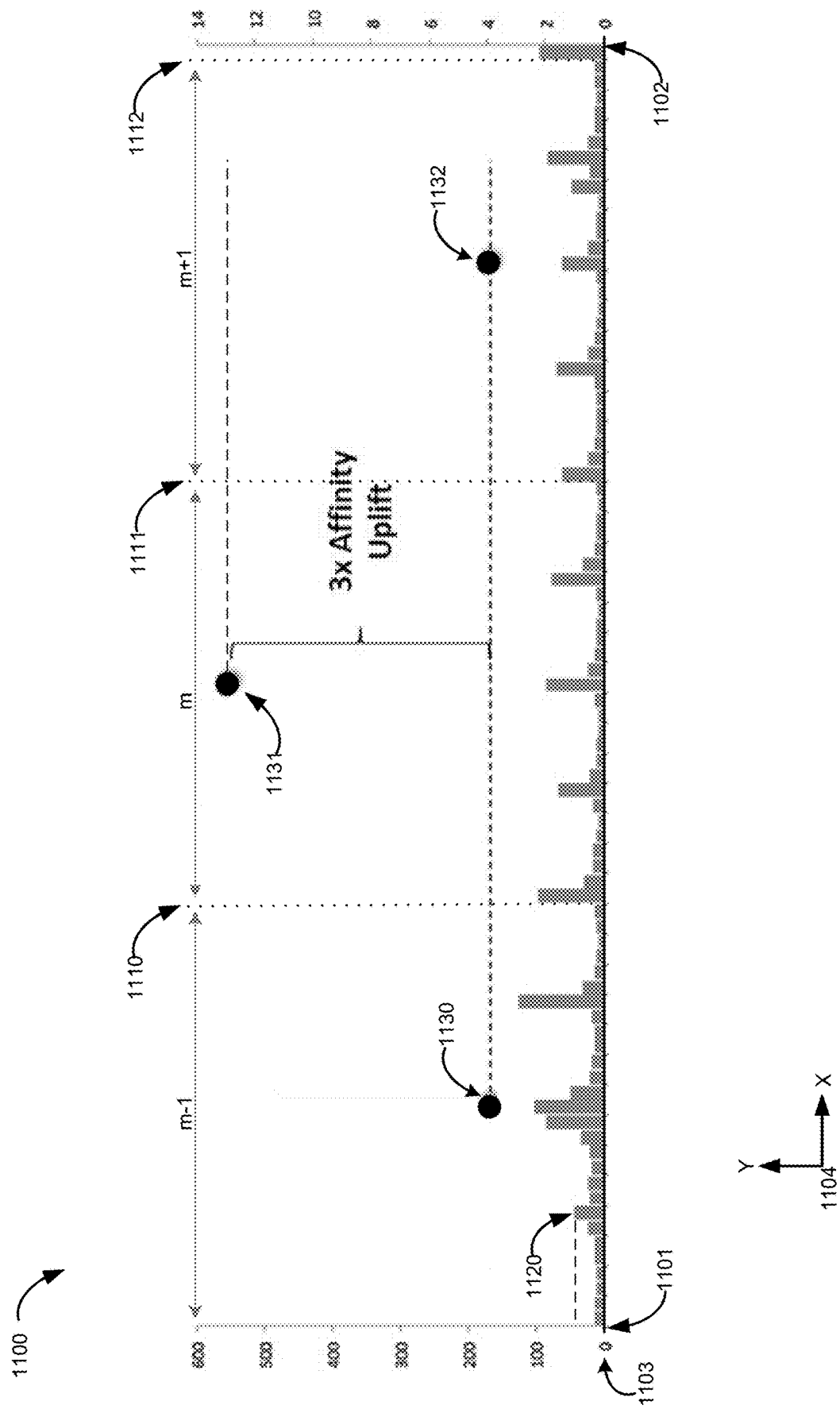
FIG. 11 is a graphical illustration of the change, over time, in a metric of set intersection.

An example graphical illustration, suitable for an example of the type just discussed, is shown in FIG. 11. FIG. 11 depicts a graph 1100, where 1104 indicates the directions of the X and Y axes. As can be seen, FIG. 11 contains two axes in the Y direction: 1101 and 1102. Axis 1103 is the single X axis.

Axis 1101 is used to indicate, in units of 1000, numbers of distinct authors in the audience for media outlet A (i.e., $oa_A$). Axis 1103, when used in conjunction with axis 1101, indicates individual days. For each day is displayed a bar graph, indicating $oa_A$ for that day. For example, a bar 1120 is indicated in FIG. 11, and a dotted line is drawn to show its height as measured by axis 1101. As can be seen, bar 1120 indicates a level somewhat lower than 50 (i.e., somewhat lower than 50,000 unique authors).

Axis 1102 is used to indicate, for each 10,000 members of $oa_A$, the number of authors that are also members of $ta_1$. Vertical lines 1110, 1111, and 1112, divide axis 1103 into the three, four-week, time periods. The time period from axis 1101 to line 1110 indicates the four-week period m−1, for which composition$_{m-1}$ was calculated to be 3.89. This value is indicated in FIG. 11 by circle 1130, which can be seen as representing, relative to axis 1102, approximately the value 4.0.

Similarly, the time period from line 1110 to line 1111 indicates the four-week period m, for which composition$_m$ was calculated to be 13.22. This value is indicated in FIG. 11 by circle 1131, which can be seen as representing, relative to axis 1102, approximately the value 13.0.

The time period from line 1111 to line 1112 indicates the four-week period m+1, for which composition$_{m+1}$ was calculated to be 4.12. This value is indicated in FIG. 11 by circle 1132, which can be seen as representing, relative to axis 1102, approximately the value 4.0.

Depending upon the particular application, circles 1130, 1131, and 1132 can be representative of other metrics of set intersection, such as coverage.

Further, while 1130, 1131, and 1132 are depicted, for purposes of example, as circles, any graphical object can be used. Further, at least one dimension, of the graphical object used, can vary as a function of at least one input to the set intersection metric, such as size of the target audience, size of outlet audience, and/or size of affinity.

Thus, FIG. 11 is a graphical illustration of the change, over time, in a metric of set intersection. The particular metric shown is composition, and the timing of the composition increase suggests it was caused by the advertising of movie 1 on television show A.

A way to further increase confidence in a causal relationship, between the advertising of movie 1 on television show A and the increase in composition, is as follows. Produce another graph that is the same as 1100, except it compares movie 1 to the outlet-audience for a television show "B." Television show B should have the property that at no point, during the four-week periods m−1, m, or m+1, was movie 1 advertised. The audience for television show B should also have a low amount of intersection, with the audience for television show A. Otherwise, if television shows A and B share a common audience, metrics derived from them would tend to be linked.

First, assume a statistically significant increase in composition is found, between movie 1 and television show B, during the time period m, when m is considered relative to the time periods m−1 and m+1. This finding would tend to decrease confidence, that it was the advertising of movie 1 on television show A that caused the composition increase. Second, assume that a statistically significant increase in affinity is not found, between movie 1 and television show B, during the time period m, when m considered relative to the time periods m−1 and m+1. This finding would tend to increase confidence, that it was the advertising of movie 1 on television show A that caused the composition increase.

Alternatively, this data can be displayed on a two-dimensional composition-coverage map, provided that coverage values are also calculated.

The following coverage values can be determined:
1.
$$\text{coverage}_{m-1}: \frac{54 \times 10^0}{0.991 \times 10^3} = 54.49 \times 10^{-3},$$

in units of members-of-overlap per member-of-target-audience. Multiplying by $10^4$ yields the more intuitively understandable composition value of 54.49, expressed in units of members-of-overlap per 1,000 members-of-target-audience.

2.
$$\text{coverage}_m: \frac{105 \times 10^0}{4.680 \times 10^3} = 22.44 \times 10^{-3}$$

members-of-overlap per member-of-target-audience, or 22.44 members-of-overlap per 1,000 members-of-target-audience.

3.
$$\text{coverage}_{m+1}: \frac{31 \times 10^0}{2.773 \times 10^3} = 11.18 \times 10^{-3}$$

members-of-overlap per member-of-target-audience, or 11.18 members-of-overlap per 1,000 members-of-target-audience.

FIG. 15D depicts the time periods m−1, m, and m+1, displayed on a composition-coverage map. The main difference between FIG. 15D, and the earlier-discussed composition-coverage maps of FIGS. 15A-C, is that the units are much smaller:
  While coverage axis 1530 (of FIGS. 15A-C) covers the full range over which coverage can vary, coverage axis 1540 (of FIG. 15D) covers only up to $100 \times 10^{-3}$ (or up to 0.1 on axis 1530).
  While composition axis 1531 (of FIGS. 15A-C) covers the full range over which composition can vary, composition axis 1541 (of FIG. 15D) covers only up to $20 \times 10^{-4}$ (or up to 0.002 on axis 1531).

As was already discussed above with respect to FIG. 11, one can see in FIG. 15D the fact that composition stays essentially same during periods m−1 and m+1, but increases significantly during period m. The new dimension of FIG. 15D, with respect to FIG. 11, is the coverage axis.

FIG. 15D shows that coverage (of the target audience for movie 1) actually decreases during time period m, in comparison to time period m−1 (decreases from $54.49 \times 10^{-3}$ to $22.44 \times 10^{-3}$). Then, during time period m+1, coverage further decreases (decreases from $22.44 \times 10^{-3}$, of period m, to $11.18 \times 10^{-3}$ of period m+1). Thus, the composition-coverage map introduces additional subtleties, in comparison to FIG. 11, that may need to be considered, in forming an evaluation of advertising effectiveness.

FIG. 15E is the same as FIG. 15D, except that the radius of each plotted point is varied (according to an appropriate function) in accordance with the size of the target audience. Thus, since the size of target audience at time period m is greater than the target audience at time period m−1, the plotted circle for target audience m is shown as having a larger radius r3, compared with radius r1 for target audience m−1. Similarly, since the size of the target audience at time period m+1 is smaller than the target audience for m, the plotted circle for target audience m+1 is shown as having a smaller radius r2, compared with radius r3 for target audience m.

3.5.2 Between Outlet Audiences

An example situation where variation over time, between sets of a same type, is important, is the understanding of changes in an outlet's audience. If, for example, the outlet is a television show series (such as "television show A" discussed above, as a vehicle for advertising a "movie 1"), it can be extremely important to a media outlet to be able to understand how its audience changes from one episode to the next.

For example, the following table represents typical data that a broadcasting network might have, on audience size for a television show A over its first three episodes:

| Episode | Audience Size |
|---------|---------------|
| E1      | 381,594       |
| E2      | 252,646       |
| E3      | 356,612       |

Unfortunately, information of this kind is not very useful, since it says nothing about how the composition of each audience may have changed, with respect to previous episodes.

Graphically, these three audience sizes can be represented in FIG. 13A by rectangles labeled 1300 (solid outline), 1301 (dotted outline), and 1302 (outlined with dot-dash pattern). An advantage of using a rectangular representation of set size, compared with the less unconventional Venn diagrams of FIGS. 12B-C, is that differences in set size can be understood by simply considering the change of 1 dimension of the rectangles, if the other dimension of the rectangles is kept constant.

Keeping with the single-dimension-varying approach, to rectangular set representation, FIG. 13B depicts the following example graphical format, for comparing the audiences of two different episodes:

A rectangle 1300 representative of the audience of an earlier episode E1.
A rectangle 1301 representative of the audience of later episode E2.
The amount of commonality, between audiences E1 and E2, is represented by the amount of overlap, between rectangles 1313 and 1301. This overlap is indicated in the figure as region 1311.

The total distance in FIG. 13B, from the leftmost side of rectangle 1300 to the rightmost side of rectangle 1301, represents the size of the union of the audiences for E1 and E2 (indicated in FIG. 13B as containing 406,564 elements). Region 1311, representative of the overlap between the audiences for E1 and E2, is shown as containing 227,676 elements, where this number of elements represents 56% of the number of elements in the union of E1 and E2. Region 1310 is representative of the number of audience members for episode E1 who did not become audience members for episode E2. Region 1310 is shown as containing 153,918 elements, where this number of elements represents 38% of the number of elements in the union of E1 and E2. Region 1312 is representative of the number of audience members for E2 who are new, with respect to the audience of E1. Region 1312 is shown as containing 24,970 elements, where this number of elements represents 6% of the number of elements in the union of E1 and E2.

Rather than just distinguishing between regions 1310, 1311, and 1312 by their horizontal positions, the difference in the outlines for rectangles 1300 and 1301 add extra emphasis. As an alternative to using differing outlines (or, perhaps, in addition to using differing outlines), rectangles 1300 and 1301 can be filled-in with different shading and/or differing colors. The overlap, between rectangles 1300 and 1301, can have a different shading and/or color, with respect to either 1300 or 1301.

FIG. 13C is the same as FIG. 13B, except that it compares E2 as the earlier episode and E3 as the later episode.

Figure 14:
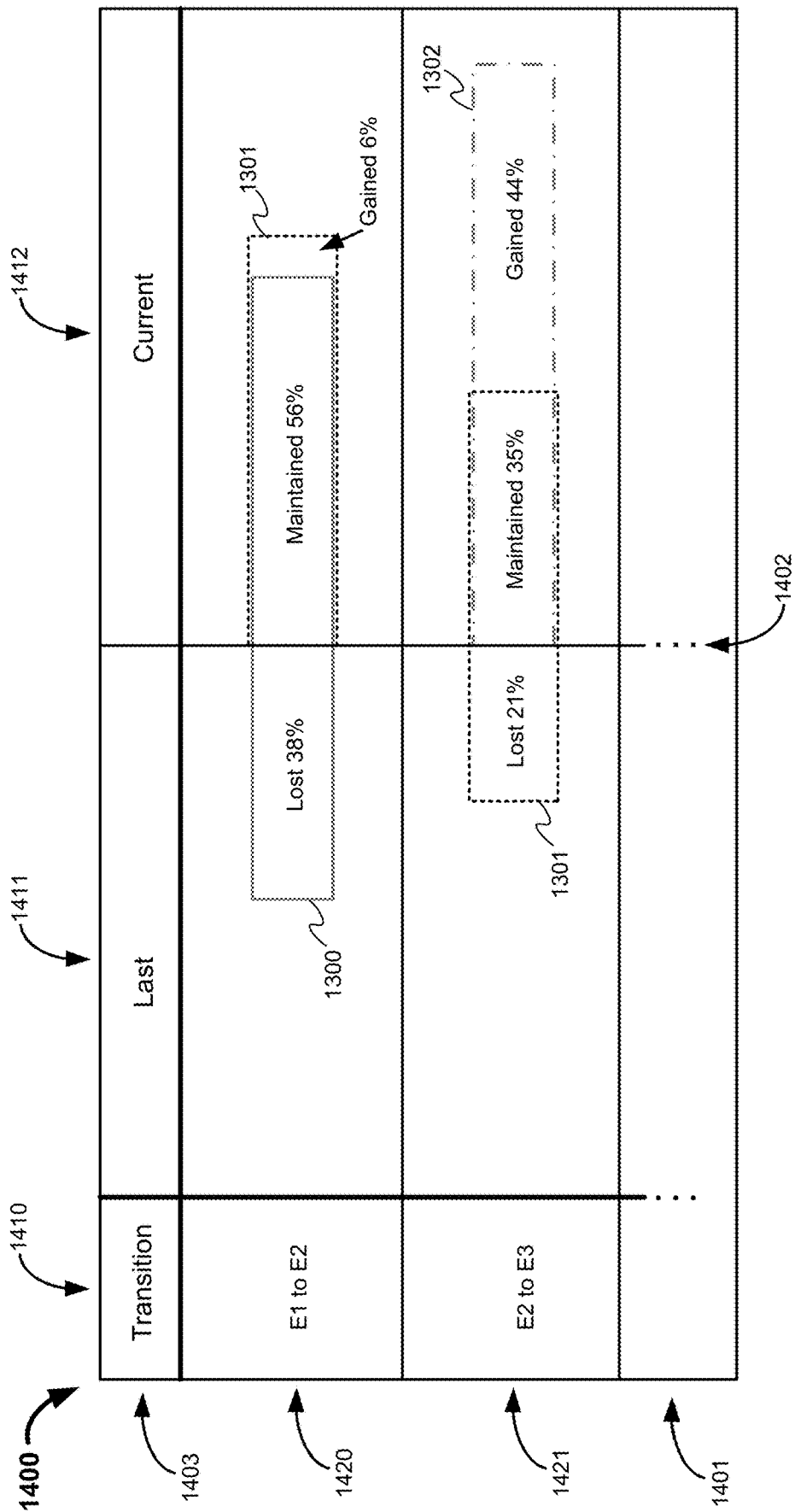
FIG. 14 depicts an example embodiment, by which multiple, rectangle-based, Venn diagrams can be combined, into a convenient multi-transitional display 1400.

FIG. 14 depicts an example embodiment, by which multiple, rectangle-based, Venn diagrams can be combined, into a convenient multi-transitional display 1400. Display 1400 contains two rows of data display:
1. Row 1420, that corresponds to FIG. 13B.
2. Row 1421, that corresponds to FIG. 13C.

Line 1402 is used to divide each rectangular Venn diagram into two columns:
1. Column 1411 that displays, of the two time periods to be compared by each row, only the data of the earlier time period.
2. Column 1412 that displays both the extent to which the two time periods intersect and also any additional elements added by the later time period.

Row 1401 is present simply to show the fact that the display can be extended to display any suitable number of time period transitions. Column 1410 is used to present useful information to the user, such as a human-readable description of the transition displayed by each row of 1400. Similarly, Row 1403 is used to provide human-readable labels, of the type of information displayed in each column.

For example, with respect to row 1420, it displays information about the transition from the audience for episode E1 to the audience for episode E2. The portion of rectangle 1300 that is within column 1411, represents that portion of audience E1 that did not carry over to E2. Thus, that portion of the audience is described as having been "lost." The percentage shown (38%) represents the size of the "lost" portion, with respect to the union of the audiences for E1 and E2. The portion of rectangle 1300 that is within column 1412, represents that portion of audience E1 that did carry over to E2 (and can therefore be described as having been "maintained" over the transition). Once again, the percentage shown (56%) is calculated with respect to the union of audiences E1 and E2. Finally, the portion of rectangle 1301, not covered by the "maintained" audience, represents those audience members knew to episode E2. As with the "lost" and "maintained" percentages, the percentage "gained" shown (6%) is calculated with respect to the union of audiences E1 and E2.

4 Additional Information

4.1 Referring To Related Applications

In addition to being incorporated by reference in their entirety, the description presented herein specifically relies on many sections of the Related Applications. A specific Related Application can be referred to as "the '123 Application," where '123 is the last three digits of the Application Number of a Related Application. Where a specific section or figure of a Related Application is believed to be of particular relevance, it can be specifically referred to.

4.2 Computing Environment

FIG. 18 depicts an example production-level computer system design in which the techniques described herein can be applied.

Computer 1811 represents any kind of hardware (through dedicated data center, cloud services, or otherwise) used for supporting a social media service. A computer 1810 can retrieve social media data, through the Internet (represented as cloud 1830), and load it onto an input database 1800.

Computer 1812 can perform the operations needed, on input database 1800, in order to transform its data into an appropriate social media database (SM_db) 1801. The operations 1812 performs include:
- Detection of frames, by techniques such as those presented in Section 4.2 of the '837 Application, and Section 1.1 of the '417 Application.
- Formation of clusters, to represent frame instances, using techniques such as those presented in Section 1 of the '294 Application, and Section 1.2 of the '417 Application.
- Indexing of the data formed, in accordance with frame-based search systems, such as those described in Section 1.1, and Section 1.2, of the '417 Application.

Databases 1820 and 1821 represent, respectively, stable "snapshots" of databases 1800 and 1801. In response to queries entered by a user at computer 1833, 1821 provides a stable database for searching, while 1820 provides a stable reference back to the original source data. User queries can travel over the Internet (indicated by cloud 1832) to a web interfacing computer 1814 that can also run a firewall program. Computer 1813 can receive the user query, collect frame instance data from the contents of SM_db 1821, and transmit the results back to computer 1833 for display to the user.

The results from computer 1813 can also be stored in a database 1802 that is private to each individual user.

In accordance with what is ordinarily known by those in the art, computers 1810, 1811, 1812, 1813, 1814, and 1833 contain computational hardware (e.g., integrated circuits), and programmable memories (volatile and/or non-volatile), of various types.

Computational hardware, whether in integrated circuit form or otherwise, is typically based upon the use of transistors (field effect and/or bipolar), although other types of components (e.g., optical, microelectromechanical, or magnetic) may be included. Any computational hardware has the property that it will consume energy, as a necessary part of being able to perform its function. Also, regardless of how quickly it can be made to operate, computational hardware will require some amount of time to change state. Because of its basis on physical devices (electronic or otherwise), computational hardware, however small, will occupy some amount of physical space.

Programmable memories are subject to the same physical limitations described above for computational hardware. A programmable memory is intended to include devices that use any kind of physics-based effects or properties, in order to store information in at least a non-transitory way, and for an amount of time commensurate with the application. The types of physical effects used to implement such storage, include, but are not limited to: maintenance of a particular state through a feedback signal, charge storage, changes to optical properties of a material, magnetic changes, or chemical changes (reversible or irreversible).

Unless specifically indicated otherwise, the terms computational hardware, programmable memory, computer-readable media, system, and sub-system, do not include persons, or the mental steps a person may undertake.

The kind of information described herein (such as data and/or instructions), that is on computer-readable media and/or programmable memories, can be stored on computer-readable code devices embodied therein. A computer-readable code device can represent that portion of a memory in which a defined unit of information (such as a bit) can be stored and/or from which a defined unit of information can be retrieved.

5 Glossary of Selected Terms audience-fingerprint: In general, for an arbitrary search result "i" (that we can also symbolically refer to as $SR_i$), a person "p1" is included in the audience-fingerprint for $SR_i$ (symbolically, audience-fingerprints) if and only if p1 has authored at least one result in $SR_i$. Further, for every person p1 who has authored at least one result in $SR_i$, p1 is included in audience-fingerprint$_i$.

author-identifier: any person name, any sequence of one or more lexical units, or any symbolic identifier, that is used to indicate a person responsible (at least in part) for the writing of some unit of natural language. The unit of natural language can be of any length, from just a few words to book-length works. A symbolic identifier can be any sequence of one or more symbols used to indicate authorship, such as the symbolic identifiers used in any form of new media. New media includes such symbolic identifiers as: an email address, a web address, or any kind of handle (such as a Twitter handle).

brand manager: a person responsible for the continued success of a brand.

commercial media outlet: Unless indicated otherwise, as used herein, refers to any media outlet where at least some of the cost of the distribution is provided through the inclusion of commercial messaging (such as advertising or "ads").

commercial messaging: the same as media messaging, except that rather than just encouraging the selection of products or services, a goal that is sufficient for certain kinds of organizations (such as non-profits), the media messaging is intended to generate sales of products or services.

consumer refers to a customer (see below in this Glossary) who is an individual.

consumer brands: branded products and/or services sold to consumers (as opposed to businesses).

customer refers to any purchaser, or potential purchaser, regardless of whether the purchaser is an individual or organization (e.g., a business or association).

lexical unit: A sequence of one or more words that has at least one meaning "m" for which the sequence operates as an indivisible unit. Meaning "m" cannot be derived from the sequence through any normal composition of the meanings of the sequence's constituent words. For example, "The White House" is not simply any house which happens to be white, and "dry ice" is not simply ice that happens to be dry.

media-buyer: any entity, such as a company, seeking to distribute media messaging.

media messaging: any kind of information that, through its distribution to an audience, is intended to encourage the selection of products or services.

media outlet: Unless indicated otherwise, as used herein, refers to any and all forms of communication by which information is distributed to an audience.

media planning: The planning of media messaging, for one or more products and/or services, with respect to one or more media outlets. The planning is intended to maximize one or more goals, such as improving the efficiency of the messaging, and coverage of a target audience.

outlet-audience: A set of people who, according to some definition, receive information from a media outlet.

record: Any unit of information, that may be retrieved from any kind of database, regardless of the amount, or the structure, of information stored.

target audience: refers to the set of people who could select, or influence the selection of, a product or service.

UNL: Refers to a "unit of natural language" in a corpus of human language. The term "UNL" can be used to refer to any unit of a natural language. For example, a UNL can refer to a unit that is of arbitrary length or that is not associated with any general linguistic structure. However, the UNL focused upon herein is the single sentence or clause.

While the invention has been described in conjunction with specific embodiments, such as the tracking of a brand by a brand manager, it is evident that many alternatives, modifications and variations will be apparent in light of the foregoing description. For example, the invention can be used to track any kind of statement (not just opinions) regarding any kind of object (not just brands) as made by any group of relevant persons (not just consumers). Accordingly, the invention is intended to embrace all such alternatives, modifications and variations, as well as those equivalents that fall within the spirit and scope of this description and its appended claims.

What is claimed is:

1. A method for representing, and operating upon, one or more sets of author-identifiers, comprising:
counting, as a result of computing hardware and programmable memory, for a first database at a first time, its first number of unique author-identifiers;
producing, as a result of computing hardware and programmable memory, a first search result of a first database, wherein the first number of unique author-identifiers is a maximum number of unique author-identifiers for any search result of the first database as long as the first database remains unchanged;
accepting, as a result of computing hardware and programmable memory, the first search result, wherein each record of the first search result contains content and an author-identifier;
hashing, as a result of computing hardware and programmable memory, a first author-identifier, of a first record of the first search result, to produce a first hash value that is at least three orders of magnitude larger than the first number of unique author-identifiers;
addressing, as a result of computing hardware and programmable memory, a first location of a first memory with the first hash value;
storing, as a result of computing hardware and programmable memory, at the first location a first value, wherein the first value is indicative of the first author-identifier being present within the first search result;
performing additional steps of hashing an author-identifier, addressing a location of the first memory, and storing a first value at the addressed location, upon additional records of the first search result, with a result of that each unique author-identifier, appearing in the first search result, is represented by a unique location in the first memory;
performing steps of hashing, addressing, and storing, upon records of a second search result, with a result that each unique author-identifier, appearing in the second search result, is represented by a unique location in a second memory;
comparing the first location of the first memory to a corresponding second location of the second memory, for purposes of determining whether the first and second sets of author-identifiers intersect with respect to the first author-identifier;
setting a third location of a third memory, corresponding to the first and second locations, to indicate inclusion of the first author-identifier in a third set of author-identifiers, if the comparison indicates an intersection;
performing an additional comparison for each additional pair of locations, a pair chosen from the first and second memories because its locations represent a common author-identifier, for purposes of determining whether a pair indicates an intersection, for the common author-identifier, in the respective first and second sets of author-identifiers;
selecting, for each additional pair of locations indicating intersection, a result location of the third memory, the result location chosen if it is representative of a common author-identifier, for a pair of locations indicating intersection;
storing, at each selected result location, an indication that its author-identifier is to be included in the third set of author-identifiers;
determining a first audience size, by counting a number of indicators of author-identifier inclusion, within the first memory;
determining a second audience size, by counting a number of indicators of author-identifier inclusion, within the memory;
determining a first affinity size, by counting a number of indicators of author-identifier inclusion, within the third memory;
determining a first measure of overlap, by dividing the first affinity size by the first audience size; and
determining a second measure of overlap, by dividing the first affinity size by the second audience size.

2. The method of claim 1, wherein the first search result is a result of searching a social media database, with at least a first query, the first query designed to identify at least part of a first target audience.

3. The method of claim 1, wherein the first search result is a result of searching a social media database with at least a first query, the first query designed to identify at least part of a first outlet audience of a first media outlet.

4. The method of claim 1, wherein, for each of the first and second memories, for each location at least one bit of information is stored, and a location with its bit set to a first value indicates that its author-identifier is present.

5. The method of claim 1, further comprising:
compacting the first memory, into a first sparse array representation; and
storing the compacted first sparse array in a non-working memory region, of the computing hardware and programmable memory.

6. The method of claim 1, further comprising:
storing at the first location, in an inverse-mapping data structure, the first author-identifier; and
storing each additional author-identifier, of the first search result, into the inverse-mapping data structure, at a same location as indicated by each additional hashing of an author-identifier.

7. The method of claim 1, further comprising:
producing the first search result as a result of at least a first query, the first query designed to identify at least part of a first target audience;

producing the second search result as a result of at least a second query, the second query designed to identify at least part of a second outlet audience of a second media outlet;
determining a first target audience size, by counting a number of indicators of author-identifier inclusion, within the first memory;
determining a second outlet-audience size, by counting a number of indicators of author-identifier inclusion, within the second memory;
determining a first affinity size, by counting a number of indicators of author-identifier inclusion, within the third memory; and
determining a first composition value, by dividing the first affinity size by the second outlet-audience size.

8. The method of claim 1, further comprising:
producing the first search result as a result of at least a first query, the first query designed to identify at least part of a first target audience;
producing the second search result as a result of at least a second query, the second query designed to identify at least part of a second outlet audience of a second media outlet;
determining a first target audience size, by counting a number of indicators of author-identifier inclusion, within the first memory;
determining a second outlet-audience size, by counting a number of indicators of author-identifier inclusion, within the second memory;
determining a first affinity size, by counting a number of indicators of author-identifier inclusion, within the third memory; and
determining a first coverage value, by dividing the first affinity size by the first target audience size.

9. The method of claim 1, further comprising:
producing the first search result as a result of at least a first query, the first query designed to identify at least part of a first target audience; and
producing the second search result as a result of at least a second query, the second query designed to identify at least part of a second target audience.

10. The method of claim 1, further comprising:
producing the first search result as a result of at least a first query, the first query designed to identify at least part of a first outlet-audience of a first media outlet; and
producing the second search result as a result of at least a second query, the second query designed to identify at least part of a second outlet-audience of a second media outlet.

11. The method of claim 1, further comprising:
categorizing the first measure of overlap as high, if it is above a first threshold level;
categorizing the second measure of overlap as high, if it is above a second threshold level; and
categorizing the first and second audiences as having a high level of overlap, if the first and second measures of overlap are categorized as high.

12. The method of claim 1, further comprising:
comparing the first location of the first memory to the corresponding second location of the second memory, for purposes of determining a first result as a logical AND of the first and second sets of author-identifiers, with respect to the first author-identifier; and
setting the third location of a third memory, corresponding to the first and second locations, to indicate according to the first result.

13. The method of claim 1, further comprising:
producing the first search result as a result of at least a first query, the first query designed to identify at least part of a first target audience;
producing the second search result as a result of at least a second query, the second query designed to identify at least part of a second outlet audience of a second media outlet;
determining a first target audience size, by counting a number of indicators of author-identifier inclusion, within the first memory;
determining a second outlet-audience size, by counting a number of indicators of author-identifier inclusion, within the second memory;
determining a first affinity size, by counting a number of indicators of author-identifier inclusion, within the third memory;
determining a first coverage value, by dividing the first affinity size by the first target audience size;
determining a first composition value, by dividing the first affinity size by the second outlet-audience size;
generating a first two-dimensional display, a first dimension representative of a coverage value, and a second dimension representative of a composition value; and
mapping a first graphical object onto the first two-dimensional display, using the first coverage value for placement of the first graphical object along the first dimension, and the first composition value for placement of the first graphical object along the second dimension.

14. The method of claim 1, further comprising:
determining a first audience size, by counting a number of indicators of author-identifier inclusion, within the first memory;
determining a second audience size, by counting a number of indicators of author-identifier inclusion, within the second memory;
determining a first affinity size, by counting a number of indicators of author-identifier inclusion, within the third memory;
determining a first overlap characterization value, by dividing the first affinity size by the first audience size;
determining a second overlap characterization value, by dividing the first affinity size by the second audience size;
generating a first two-dimensional display, a first dimension representative of a first overlap characterization metric and a second dimension representative of a second overlap characterization metric; and
mapping a first graphical object onto the first two-dimensional display, using the first overlap characterization value for placement of the first graphical object along the first dimension, and the second overlap characterization value for placement of the first graphical object along the second dimension.

15. The method of claim 1, further comprising:
representing, on a two-dimensional display, the first set of author-identifiers as a first graphical object;
representing, on a two-dimensional display, the second set of author-identifiers as a second graphical object;
simulating a repulsive force, as acting between the first and second graphical objects;
representing, on a two-dimensional display, the third set of author-identifiers as a third graphical object, the third graphical object appearing to connect the first and second graphical objects; and
simulating the third graphical object as exerting an attractive force, acting to bring into closer proximity the first and second graphical objects.

16. The method of claim 1, further comprising:

producing the first search result as a result of at least a first query, the first query designed to identify at least part of a first type of audience during a first time period;

producing the second search result as a result of at least a second query, the second query designed to identify at least part of a second type of audience during a first time period;

producing a third search result as a result of at least a third query, the third query designed to identify at least part of a first type of audience during a second time period;

producing a fourth search result as a result of at least a fourth query, the second query designed to identify at least part of a second type of audience during a second time period;

performing a comparison for each pair of locations, a pair chosen from the first and second memories because its locations represent a common author-identifier, for purposes of determining whether a pair indicates an intersection, for the common author-identifier, in the respective first and second sets of author-identifiers;

selecting, for each pair of locations indicating intersection, a first result location of a fifth memory, the first result location chosen if it is representative of a common author-identifier, for a pair of locations indicating intersection;

storing, at each selected first result location, an indication that its author-identifier is to be included in the fifth set of author-identifiers;

performing steps of hashing, addressing, and storing, upon records of a third search result, such that a third set of author identifiers, as represented by a third memory, contains an indicator for each author-identifier of the third search result;

performing steps of hashing, addressing, and storing, upon records of a fourth search result, such that a fourth set of author identifiers, as represented by a fourth memory, contains an indicator for each author-identifier of the fourth search result;

performing a comparison for each pair of locations, a pair chosen from the third and fourth memories because its locations represent a common author-identifier, for purposes of determining whether a pair indicates an intersection, for the common author-identifier, in the respective third and fourth sets of author-identifiers;

selecting, for each pair of locations indicating intersection, a second result location of a sixth memory, the second result location chosen if it is representative of a common author-identifier, for a pair of locations indicating intersection;

storing, at each selected second result location, an indication that its author-identifier is to be included in the sixth set of author-identifiers;

determining a first audience size, by counting a number of indicators of author-identifier inclusion, within the first memory;

determining a second audience size, by counting a number of indicators of author-identifier inclusion, within the second memory;

determining a third audience size, by counting a number of indicators of author-identifier inclusion, within the third memory;

determining a fourth audience size, by counting a number of indicators of author-identifier inclusion, within the fourth memory;

determining a first affinity size, by counting a number of indicators of author-identifier inclusion, within the fifth memory;

determining a second affinity size, by counting a number of indicators of author-identifier inclusion, within the sixth memory;

determining a first overlap characterization value of a first type, by dividing the first affinity size by the first audience size; and determining a second overlap characterization value of the first type, by dividing the second affinity size by the third audience size.

\* \* \* \* \*